(12) United States Patent
Nozaki et al.

(10) Patent No.: US 11,964,729 B2
(45) Date of Patent: Apr. 23, 2024

(54) OPERATED COMPONENT AND COMMUNICATION SYSTEM FOR HUMAN-POWERED VEHICLE

(71) Applicant: SHIMANO INC., Sakai (JP)

(72) Inventors: Akihiro Nozaki, Sakai (JP); Tomohiro Takimoto, Sakai (JP); Hirofumi Fukui, Sakai (JP)

(73) Assignee: SHIMANO INC., Sakai (JP)

( * ) Notice: Subject to any disclaimer, the term of this patent is extended or adjusted under 35 U.S.C. 154(b) by 824 days.

(21) Appl. No.: 17/091,245

(22) Filed: Nov. 6, 2020

(65) Prior Publication Data
US 2022/0081068 A1 Mar. 17, 2022

Related U.S. Application Data

(63) Continuation-in-part of application No. 17/017,697, filed on Sep. 11, 2020, now abandoned.

(51) Int. Cl.
*B62M 25/08* (2006.01)
*B62J 43/30* (2020.01)
(Continued)

(52) U.S. Cl.
CPC ............. *B62M 25/08* (2013.01); *B62J 43/30* (2020.02); *B62K 23/06* (2013.01); *H04W 4/40* (2018.02)

(58) Field of Classification Search
CPC ... B62J 43/30; B62J 43/13; B62J 43/20; B62J 43/00; B62J 43/28; B62J 45/20; B62J 45/00; B62J 45/41; B62J 45/413; B62J 2001/085; B62J 50/22; B62J 99/00; B62K 23/06; B62K 23/02; B62K 23/00; B62K 25/08; B62M 25/08; B62M 9/122; B62M 9/132; B62M 6/45; B62M 6/50; B62M 6/55; B62M 6/90; H04W 4/40
USPC ...... 340/539.13, 539.26; 345/156, 173, 158; 370/329, 338; 455/41.2, 426.1, 73, 414.1, 455/522, 41.1, 556.1, 420, 569.2, 296, 455/436, 3.01; 702/141, 150, 173, 178, 702/187, 160, 188, 19, 44, 149, 182, 108,
(Continued)

(56) References Cited

U.S. PATENT DOCUMENTS 6,204,775 B1 3/2001 Kubacsi
8,909,424 B2 12/2014 Jordan et al.
(Continued)

FOREIGN PATENT DOCUMENTS

CN 107636978 A * 1/2018 ........... H04B 17/318
EP 3817317 A1 * 5/2021 ......... H04L 63/0428

*Primary Examiner* — Jeffrey P Aiello
(74) *Attorney, Agent, or Firm* — MORI & WARD, LLP

(57) ABSTRACT

An operated component for a human-powered vehicle comprises a first wired communicator and a first wireless communicator. The first wired communicator has a first wired communication state in which the first wired communicator is configured to recognize a wired signal transmitted via a wired communication channel. The first wireless communicator has a first wireless communication state in which the first wireless communicator is configured to recognize a wireless signal transmitted via a wireless communication channel. The first wireless communicator is configured to be in the first wireless communication state while the first wired communicator is in the first wired communication state.

31 Claims, 11 Drawing Sheets

(51) Int. Cl.
    *B62K 23/06*     (2006.01)
    *H04W 4/40*     (2018.01)

(58) Field of Classification Search
    USPC ............... 702/124, 127, 139, 142, 165, 189; 709/217
    See application file for complete search history.

(56) References Cited

U.S. PATENT DOCUMENTS

| | | |
|---|---|---|
| 2002/0075876 A1 | 6/2002 | Yoshikawa et al. |
| 2014/0310739 A1* | 10/2014 | Ricci .................... G06Q 20/321 |
| | | 725/75 |
| 2015/0061895 A1* | 3/2015 | Ricci ..................... B60K 28/00 |
| | | 340/902 |
| 2017/0029057 A1 | 2/2017 | Kato et al. |
| 2017/0075701 A1* | 3/2017 | Ricci .................... G06F 3/0637 |
| 2018/0043968 A1 | 2/2018 | Sala |
| 2018/0229803 A1* | 8/2018 | Wesling ................ B62M 9/132 |
| 2018/0273140 A1 | 9/2018 | Sala |

\* cited by examiner

OPERATED COMPONENT AND COMMUNICATION SYSTEM FOR HUMAN-POWERED VEHICLE

CROSS-REFERENCE TO RELATED APPLICATIONS

The present application is a continuation-in-part application of the U.S. patent application Ser. No. 17/017,697 filed Sep. 11, 2020. The contents of this application are incorporated herein by reference in their entirety.

BACKGROUND OF THE INVENTION

Field of the Invention

The present invention relates to an operated component and a communication system for a human-powered vehicle.

Discussion of the Background

A human-powered vehicle includes a communication device such as a wired communication device or a wireless communication device.

SUMMARY OF THE INVENTION

In accordance with a first aspect of the present invention, an operated component for a human-powered vehicle comprises a first wired communicator and a first wireless communicator. The first wired communicator has a first wired communication state in which the first wired communicator is configured to recognize a wired signal transmitted via a wired communication channel. The first wireless communicator has a first wireless communication state in which the first wireless communicator is configured to recognize a wireless signal transmitted via a wireless communication channel. The first wireless communicator is configured to be in the first wireless communication state while the first wired communicator is in the first wired communication state.

With the operated component according to the first aspect, it is possible to promptly use the wireless communication channel as backup when the wired communication channel is not available because the first wireless communicator is in the first wireless communication state.

In accordance with a second aspect of the present invention, the operated component according to the first aspect is configured so that the first wireless communicator has a listen condition in which the first wireless communicator is configured to recognize the wireless signal, and a non-listen condition in which the first wireless communicator is configured not to recognize the wireless signal. The first wireless communication state includes at least one of a continuous listen state in which the listen condition is continuously maintained without the non-listen condition, and an intermittent listen state in which the listen condition and the non-listen condition are alternately repeated. The first wireless communicator is configured to be in at least one of the continuous listen state and the intermittent listen state while the first wired communicator is in the first wired communication state.

With the operated component according to the second aspect, it is possible to reduce power consumption of the first wireless communicator while the first wireless communicator is in the first wireless communication state.

In accordance with a third aspect of the present invention, the operated component according to the second aspect is configured so that the first wireless communicator is configured to be in the intermittent listen state if the first wired communicator starts the first wired communication state.

With the operated component according to the third aspect, it is possible to reduce power consumption of the first wireless communicator while the first wireless communicator is in the first wireless communication state.

In accordance with a fourth aspect of the present invention, the operated component according to the second or third aspect is configured so that the first wireless communicator is configured to change the first wireless communication state from the intermittent listen state to the continuous listen state if the first wireless communicator recognizes the wireless signal in the intermittent listen state.

With the operated component according to the fourth aspect, it is possible to reliably respond to the wireless signal in the first wireless communication state.

In accordance with a fifth aspect of the present invention, the operated component according to any one of the second to fourth aspects is configured so that the first wireless communicator is configured to change the first wireless communication state from the continuous listen state to the intermittent listen state if the first wireless communicator does not recognize a wireless signal during a determination time in the continuous listen state.

With the operated component according to the fifth aspect, it is possible to reduce power consumption of the first wireless communicator while the wireless signal is not transmitted via the wireless communication channel.

In accordance with a sixth aspect of the present invention, the operated component according to any one of the first to fifth aspects further comprises an additional wired communicator configured to communicate with the first wired communicator via the wired communication channel.

With the operated component according to the sixth aspect, it is possible to assist the first wired communicator using the additional wired communicator.

In accordance with a seventh aspect of the present invention, the operated component according to the sixth aspect is configured so that the additional wired communicator is configured to receive a control signal transmitted from the second wired communicator via the wired communication channel. The additional wired communicator is configured to transmit the wired signal to the first wired communicator via the wired communication channel based on the control signal.

With the operated component according to the seventh aspect, it is possible to transmit the control signal to the first wired communicator through the additional wired communicator.

In accordance with an eighth aspect of the present invention, the operated component according to the sixth or seventh aspect is configured so that the first wired communicator and the first wireless communicator are configured to be integrally provided with a single unit and configured to be provided as a separate unit from the additional wired communicator.

With the operated component according to the eighth aspect, it is possible to simplify the structure of the first wired communicator and the first wireless communicator.

In accordance with a ninth aspect of the present invention, the operated component according to any one of the sixth to eighth aspects is configured so that the additional wired communicator includes an additional connection port to which an electric cable is to be connected.

With the operated component according to the ninth aspect, it is possible to establish the wired communication via the additional connection port and the electric cable.

In accordance with a tenth aspect of the present invention, the operated component according to any one of the first to ninth aspects is configured so that the first wired communicator includes a first connection port to which an electric cable is to be connected.

With the operated component according to the tenth aspect, it is possible to establish the wired communication via the first connection port and the electric cable.

In accordance with an eleventh aspect of the present invention, the operated component according to any one of the first to tenth aspects is configured so that the first wireless communicator is configured to be electrically connected to the first wired communicator without an electric cable.

With the operated component according to the eleventh aspect, it is possible to simplify the structure of the first wired communicator and the first wireless communicator.

In accordance with a twelfth aspect of the present invention, the operated component according to any one of the first to eleventh aspects further comprises an electric component and a component controller. The electric component includes a base member, a movable member movably coupled to the base member, and an electric actuator configured to move the movable member relative to the base member. The component controller is configured to control the electric actuator to move the movable member relative to the base member.

With the operated component according to the twelfth aspect, it is possible to operate the electric component based on the wireless signal and/or the wired signal using the component controller.

In accordance with a thirteenth aspect of the present invention, a communication system comprises the operated component according to any one of the first to twelfth aspects and an input component. The input component includes a second wired communicator and a second wireless communicator. The second wired communicator has a second wired communication state in which the second wired communicator is configured to transmit and/or recognize the wired signal via the wired communication channel. The second wireless communicator has a second wireless communication state in which the second wireless communicator is configured to transmit the wireless signal via the wireless communication channel. The second wireless communicator is configured to be in the second wireless communication state while the second wired communicator is in a non-wired communication state different from the second wired communication state.

With the communication system according to the thirteenth aspect, it is possible to use the wireless communication channel as backup when the second wired communicator is in the non-wired communication state.

In accordance with a fourteenth aspect of the present invention, the communication system according to the thirteenth aspect is configured so that the operated component further comprises an additional wired communicator configured to communicate with the second wired communicator via the wired communication channel.

With the communication system according to the fourteenth aspect, it is possible to assist the second wired communicator using the additional wired communicator.

In accordance with a fifteenth aspect of the present invention, the communication system according to the fourteenth aspect is configured so that the first wired communicator is configured to communicate with at least one of the second wired communicator and the additional wired communicator via the wired communication channel.

With the communication system according to the fifteenth aspect, it is possible to effectively utilize the wired communication.

In accordance with a sixteenth aspect of the present invention, the communication system according to the fourteenth or fifteenth aspect is configured so that the second wireless communicator is configured to communicate with the first wireless communicator via the wireless communication channel. The first wired communicator is configured to communicate with the additional wired communicator via the wired communication channel.

With the communication system according to the sixteenth aspect, it is possible to promptly respond the wireless signal transmitted from the second wireless communicator because the first wireless communicator directly communicates with the second communicator via the wireless communication channel.

In accordance with a seventeenth aspect of the present invention, the communication system according to any one of the thirteenth to sixteenth aspects is configured so that the second wired communicator includes a second connection port to which an electric cable is to be connected.

With the communication system according to the seventeenth aspect, it is possible to establish the wired communication via the second connection port and the electric cable.

In accordance with an eighteenth aspect of the present invention, the communication system according to any one of the thirteenth to seventeenth aspects is configured so that the second wireless communicator is configured to receive electric power supply from a first electric power source. The second wireless communicator is configured to be in the second wireless communication state in response to the electric power supply from the first electric power source.

With the communication system according to the eighteenth aspect, it is possible to use the wireless communication in the input component in response to the electric power supply from the first electric power.

In accordance with a nineteenth aspect of the present invention, the communication system according to any one of the thirteenth to eighteenth aspects is configured so that the second wired communicator is configured to receive electric power supply from an additional electric power source different from the first electric power source. The second wired communicator is configured to be in the second wired communication state in response to the electric power supply from the additional electric power source.

With the communication system according to the nineteenth aspect, it is possible to use the wired communication in the input component in response to the electric power supply from the additional electric power source.

In accordance with a twentieth aspect of the present invention, the communication system according to the nineteenth aspect is configured so that the first wired communicator is configured to receive electric power supply from the additional electric power source. The first wireless communicator is configured to receive electric power supply from the additional electric power source.

With the communication system according to the twentieth aspect, it is possible to utilize the additional electric power source for the first wired communicator and the first wireless communicator.

In accordance with a twenty-first aspect of the present invention, the communication system according to any one of the fourteenth to sixteenth aspects is configured so that the operated component comprises an electric component and a component controller. The electric component includes a base member, a movable member movably coupled to the base member, and an electric actuator configured to move the movable member relative to the base member. The component controller is configured to control the electric actuator to move the movable member relative to the base member. The second wired communicator is configured to transmit, to the additional wired communicator, first control information included in the wired signal transmitted via the wired communication channel. The additional wired communicator is configured to transmit, to the first wired communicator, the first control information included in the wired signal transmitted via the wired communication channel. The component controller is configured to control the electric actuator to move the movable member relative to the base member based on the first control information.

With the communication system according to the twenty-first aspect, it is possible to operate the electric component using the wired communication.

In accordance with a twenty-second aspect of the present invention, the communication system according to the twenty-first aspect is configured so that the second wireless communicator is configured to transmit, to the first wireless communicator, second control information included in the wireless signal transmitted via the wireless communication channel. The component controller is configured to control the electric actuator to move the movable member relative to the base member based on the second control information.

With the communication system according to the twenty-second aspect, it is possible to operate the electric component using the wireless communication.

In accordance with a twenty-third aspect of the present invention, the communication system according to the twenty-second aspect is configured so that the first wireless communicator is configured to transmit, to the first wired communicator, second control information included in the wireless signal transmitted via the wireless communication channel.

With the communication system according to the twenty-third aspect, it is possible to transmit the second control information included in the wireless signal via the wired communication channel.

In accordance with a twenty-fourth aspect of the present invention, the communication system according to the twenty-third aspect is configured so that the operated component further comprises an additional wired communicator configured to communicate with the first wired communicator via the wired communication channel. The first wired communicator is configured to transmit the second control information to the additional wired communicator via the wired communication channel With the communication system according to the twenty-fourth aspect, it is possible to forward the second control information included in the wireless signal to the additional wired communicator via the wired communication channel. Thus, it is possible to utilize the second control information for another component through the additional wired communicator.

In accordance with a twenty-fifth aspect of the present invention, an operated component for a human-powered vehicle comprises a first wired communicator and a first wireless communicator. The first wired communicator has a first wired communication state in which the first wired communicator is configured to recognize a wired signal transmitted via a wired communication channel. The first wireless communicator has a first wireless communication state in which the first wireless communicator is configured to recognize a wireless signal transmitted via a wireless communication channel. The first wireless communicator is configured to be in the first wireless communication state if the wired communication channel is disconnected.

With the operated component according to the twenty-fifth aspect, it is possible to promptly use the wireless communication channel as backup when the wired communication channel is disconnected because the first wireless communicator is in the first wireless communication state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
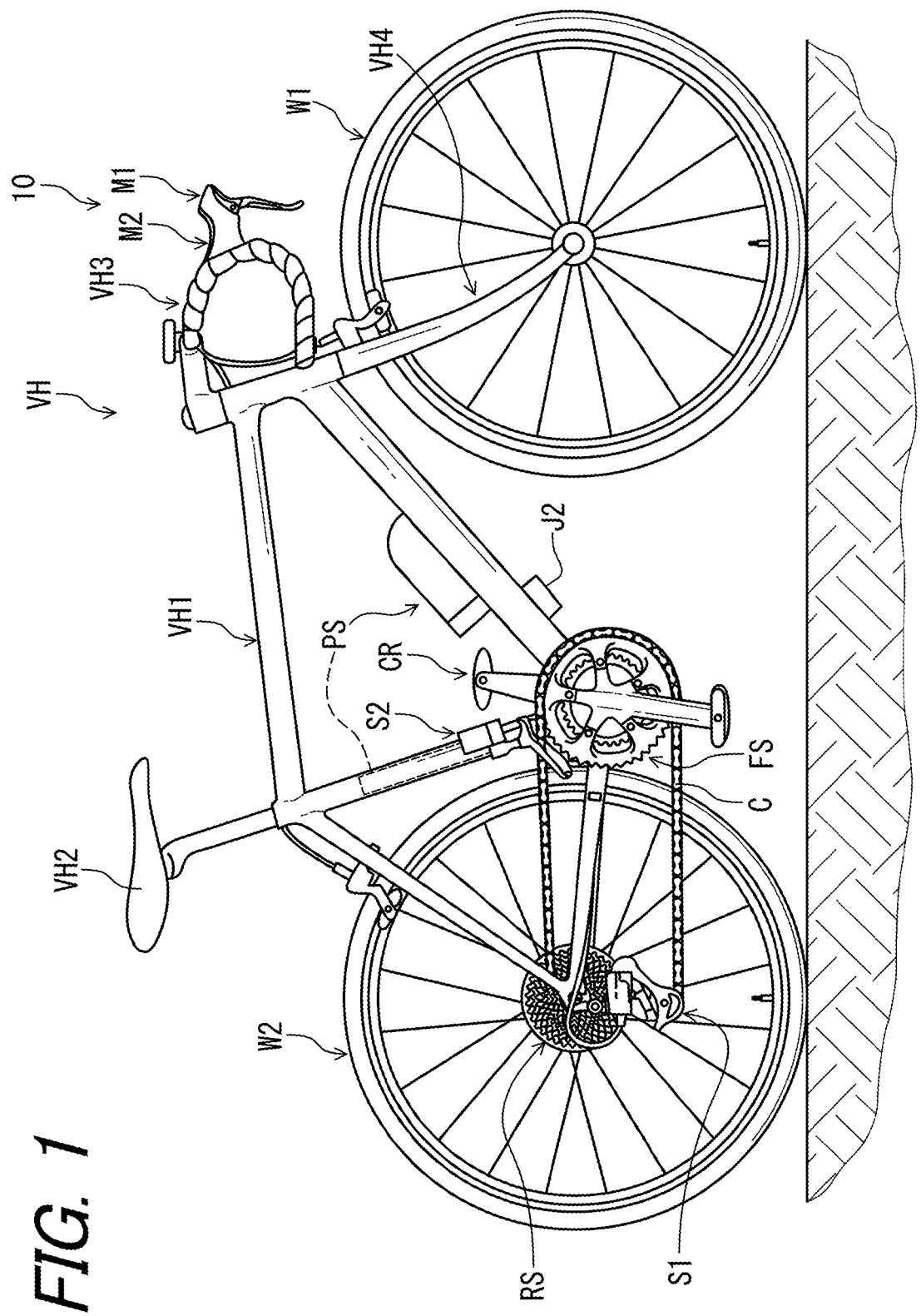
FIG. 1 is a side elevational view of a human-powered vehicle including a wireless communication system in accordance with an embodiment.

The embodiment(s) will now be described with reference to the accompanying drawings, wherein like reference numerals designate corresponding or identical elements throughout the various drawings.

Referring initially to FIG. 1, a human-powered vehicle VH includes a communication system 10 in accordance with an embodiment. The communication system 10 comprises an operated component S1 and an input component M1. The communication system 10 comprises an additional operated component S2 and an additional input component M2. However, at least one of the additional operated component S2 and the additional input component M2 can be omitted from the communication system 10.

For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In the present embodiment, the human-powered vehicle VH preferably has a smaller size than that of a four-wheeled automobile. However, the human-powered vehicle VH can have an arbitrary size.

Examples of the human-powered vehicle VH include a bicycle, a tricycle, and a kick scooter. In the present embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the communication system 10 can be applied to mountain bikes, time trial bikes or any type of human-powered vehicles.

The human-powered vehicle VH further includes a vehicle body VH1, a saddle VH2, a steering device VH3, a front fork VH4, a drive train VH5, a rear swing arm VH6, a first wheel W1, and a second wheel W2. The front fork VH4 is rotatably mounted to the vehicle body VH1. The steering device VH3 is secured to the front fork VH4. Examples of the steering device VH3 include a handlebar. The rear swing arm VH6 is pivotally coupled to the vehicle body VH1. The first wheel W1 is rotatably coupled to the front fork VH4. The second wheel W2 is rotatably coupled to the rear swing arm VH6.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the steering device VH3. Accordingly, these terms, as utilized to describe the communication system 10 or other components, should be interpreted relative to the human-powered vehicle VH equipped with the communication system 10 as used in an upright riding position on a horizontal surface.

The human-powered vehicle VH includes a crank CR, a front sprocket assembly FS, a rear sprocket assembly RS, a chain C, and an electric power source PS. The electric power source PS can also be referred to as an additional electric power source PS. The front sprocket assembly FS is secured to the crank CR. The rear sprocket assembly RS is rotatably mounted to the vehicle body VH1. The chain C is engaged with the front sprocket assembly FS and the rear sprocket assembly RS. The operated component S1 is mounted to the vehicle body VH1 and is configured to shift the chain C relative to the rear sprocket assembly RS to change a gear position. Each of the operated component S1 and the additional operated component S2 includes a gear changing device such as a derailleur. The additional operated component S2 is mounted to the vehicle body VH1 and is configured to shift the chain C relative to the front sprocket assembly FS to change a gear position. The electric power source PS is configured to supply electric power to the operated component S1, the additional operated component S2, the input component M1, and the additional input component M2. In the present embodiment, the electric power source PS is mounted to the vehicle body VH1. As indicated with a broken line in FIG. 1, however, the electric power source PS can be provided at other location such as an inside of the vehicle body VH1 (e.g., a seat tube). The electric power source PS provided in other locations can be configured to supply electric power to the operated component S1, the additional operated component S2, the input component M1, and the additional input component M2.

The operated component S1 includes a rear derailleur, and the additional operated component S2 includes a front derailleur. However, the structure and/or configuration of the operated component S1 can apply to the additional operated component S2. In such an embodiment, the additional operated component S2 can also be referred to as an operated component S2, and the additional input component M2 can also be referred to as an input component M2.

Figure 2:
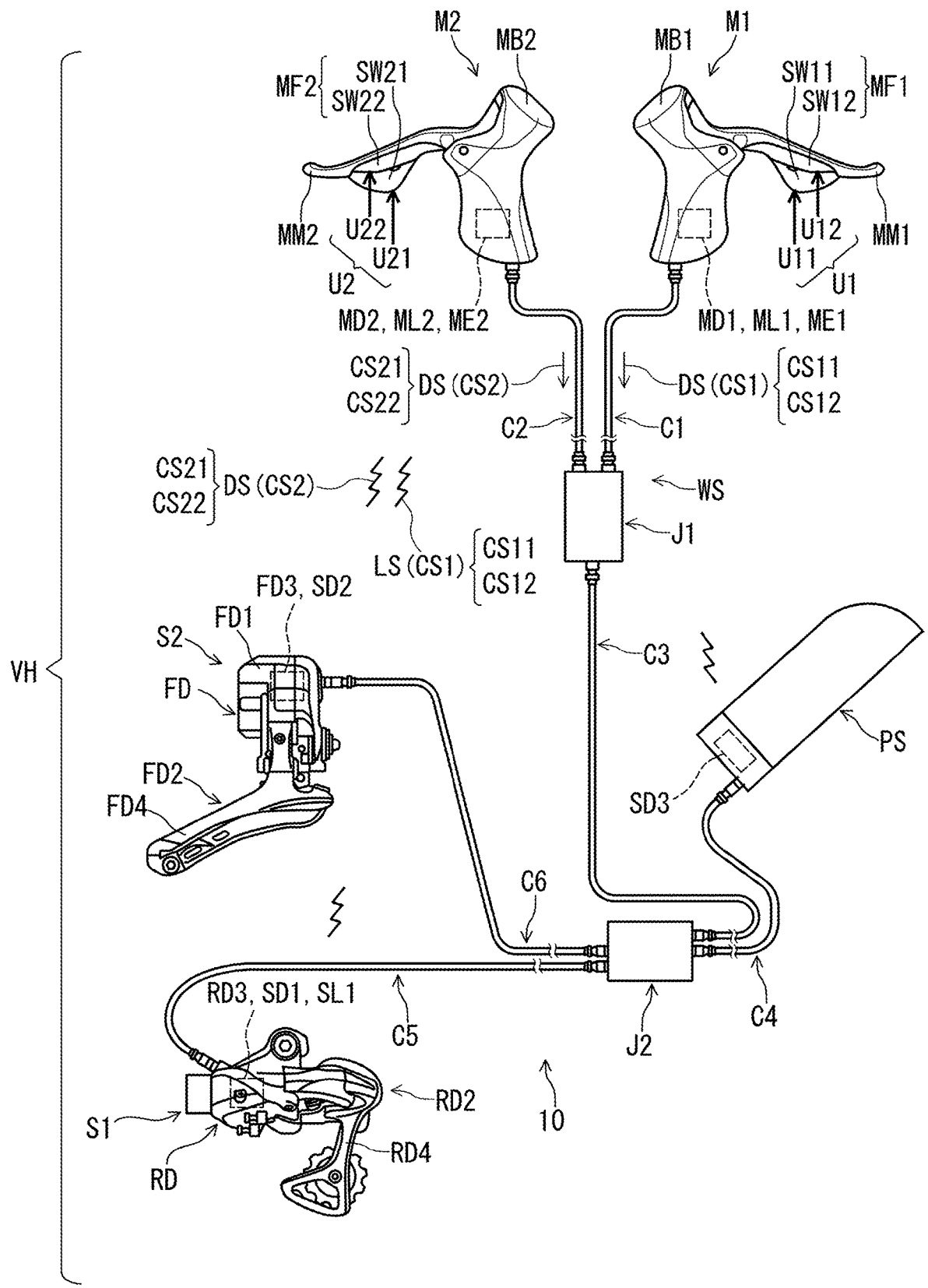
FIG. 2 is a schematic diagram of the human-powered vehicle illustrated in FIG.1.

As seen in FIG. 2, the operated component S1 further comprises an electric component RD. The electric component RD includes a base member RD1, a movable member RD2, and an electric actuator RD3. The movable member RD2 is movably coupled to the base member RD1. The electric actuator RD3 is configured to move the movable member RD2 relative to the base member RD1. Examples of the electric actuator RD3 includes a motor. The movable member RD2 includes a chain guide RD4 configured to guide the chain C.

In the present embodiment, the electric component RD include a rear gear-changing device such as a rear derailleur. However, the electric component RD can include an assist driving unit, an adjustable seatpost, a suspension, and a front gear-changing device such as a front derailleur if needed and/or desired.

The additional operated component S2 further comprises an additional electric component FD. The additional electric component FD includes a base member FD1, a movable member FD2, and an electric actuator FD3. The movable member FD2 is movably coupled to the base member FD1. The electric actuator FD3 is configured to move the movable member FD2 relative to the base member FD1. Examples of the electric actuator FD3 includes a motor. The movable member FD2 includes a chain guide FD4 configured to guide the chain C.

In the present embodiment, the additional electric component FD include a front gear-changing device such as a front derailleur. However, the additional electric component FD can include an assist driving unit, an adjustable seatpost, a suspension, and a rear gear-changing device such as a rear derailleur if needed and/or desired. The additional electric component FD can include the assist driving unit for adding propulsion force to the bicycle. The additional electric component FD can include both of the front derailleur and the assist driving unit. The power source can be configured to supply electric power to both of the operated component S1 and the operated component S2. The power source can be configured to supply electric power to both of the rear derailleur and the front derailleur. The power source can be configured to supply electric power to each of the rear derailleur, the front derailleur, and the assist driving unit.

The input component M1 includes a base body MB1, an operating member MM1, and a user input interface MF1. The operating member MM1 is movably coupled to the base body MB1. The user input interface MF1 is configured to receive a user input U1. The input component M1 is configured to generate a control signal CS1 in response to the user input U1 received by the user input interface MF1. In the present embodiment, the user input interface MF1 includes a first electric switch SW11 and a first additional electric switch SW12. The first electric switch SW11 is configured to receive a first user input U11. The first additional electric switch SW12 is configured to receive a first additional user input U12. The input component M1 is configured to generate a first control signal CS11 in response to the first user input U11 received by the first electric switch SW11. The input component M1 is configured to generate a first additional control signal CS12 in response to the first additional user input U12 received by the first additional electric switch SW12. The structure of the input component M1 is not limited to the above structure.

The additional input component M2 includes a base body MB2, an operating member MM2, and a user input interface MF2. The operating member MM2 is movably coupled to the base body MB2. The user input interface MF2 is configured to receive a user input U2. The additional input component M2 is configured to generate a control signal CS2 in response to the user input U2 received by the user input interface MF2. In the present embodiment, the user input interface MF2 includes a second electric switch SW21 and a second additional electric switch SW22. The second electric switch SW21 is configured to receive a second user input U21. The second additional electric switch SW22 is configured to receive a second additional user input U22. The additional input component M2 is configured to generate a second control signal CS21 in response to the second user input U21 received by the second electric switch SW21. The additional input component M2 is configured to generate a second additional control signal CS22 in response to the second additional user input U22 received by the second additional electric switch SW22. The structure of the additional input component M2 is not limited to the above structure.

The control signal CS1 is distinguishable from the control signal CS2. The control signals CS11, CS12, CS21, and CS22 are distinguishable from each other. However, the control signal CS2 can be omitted from the control signals. The additional input component M2 can be omitted from the communication system 10.

The electric component RD is configured to shift the chain C in response to the control signal CS1 transmitted from the input component M1. The electric component RD is configured to upshift in response to the first control signal CS11 transmitted from the input component M1. The electric component RD is configured to downshift in response to the first additional control signal CS12 transmitted from the input component M1.

The additional electric component FD is configured to shift the chain C in response to the control signal CS2 transmitted from the additional input component M2. The additional electric component FD is configured to upshift in response to the second control signal CS21 transmitted from the additional input component M2. The additional electric component FD is configured to downshift in response to the second additional control signal CS22 transmitted from the additional input component M2.

The human-powered vehicle VH includes an electric wiring structure WS. The electric power source PS is electrically connected to the operated component S1 and the additional operated component S2 with the electric wiring structure WS to supply electricity to the operated component S1 and the additional operated component S2.

The electric wiring structure WS includes junctions J1 and J2 and electric cables C1 to C6. Each of the electric cables C1 to C6 includes electric connectors at both ends thereof. The operating device 12 is electrically connected to the junction J1 with the electric cable C1. The operating device 14 is electrically connected to the junction J1 with the electric cable C2. The junction J1 is electrically connected to the junction J2 with the electric cable C3. The junction J2 is electrically connected to the electric power source PS with the electric cable C4. The junction J2 is electrically connected to the operated component S1 with the electric cable C5. The junction J2 is electrically connected to the additional operated component S2 with the electric cable C6.

The electric wiring structure WS constitutes a wired communication channel. A wired signal DS including the control signal CS1 (e.g., the first control signal CS11, the first additional control signal CS12) is transmitted via the wired communication channel among the operated component S1, the input component M1, the additional input component M2, the additional operated component S2, and the electric power source PS. Furthermore, a wireless communication channel is established among the operated component S1, the input component M1, and the additional input component M2. A wireless signal LS including the control signal CS2 (e.g., the second control signal CS21, the second additional control signal CS22) is transmitted via the wireless communication channel.

Figure 3:
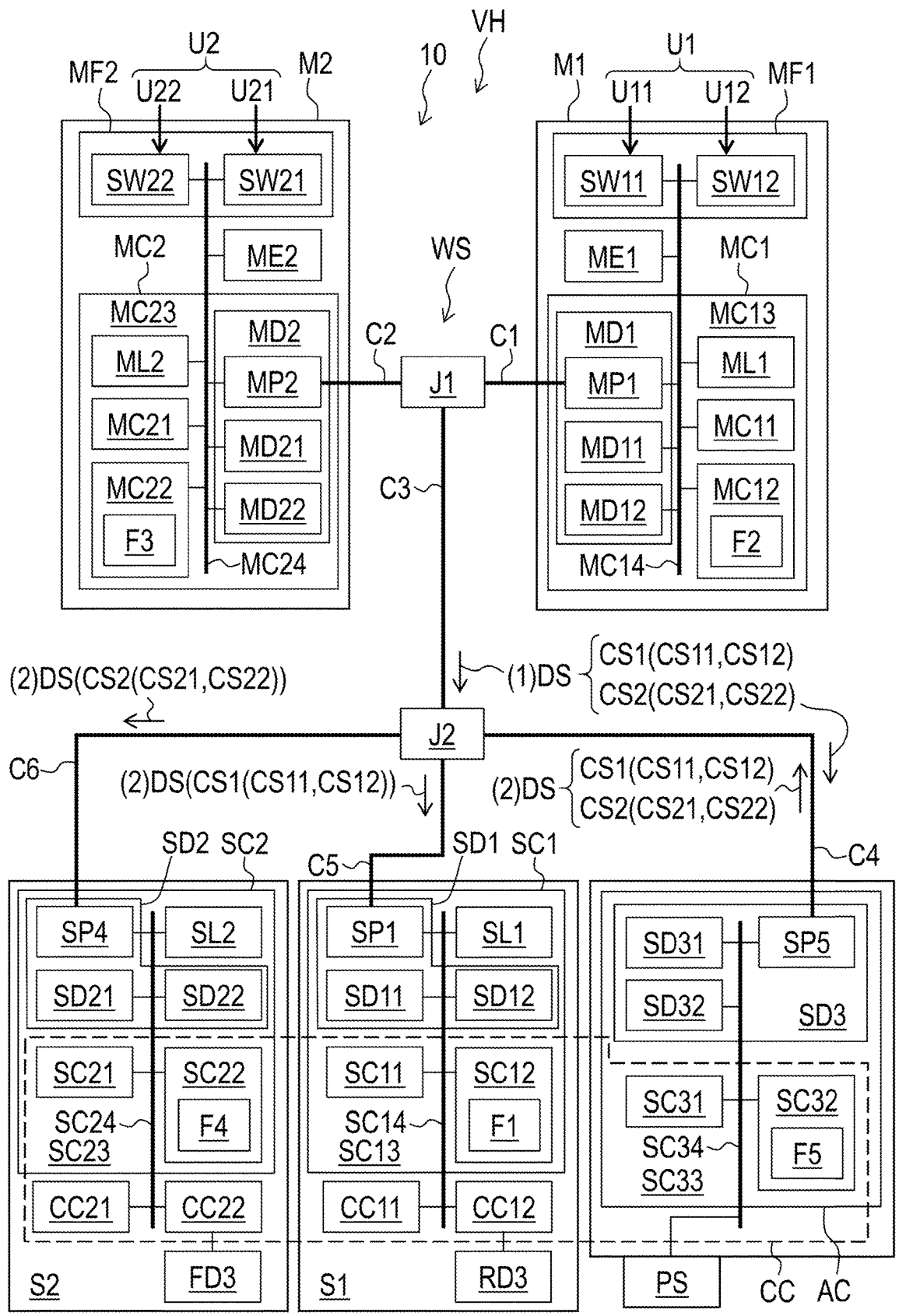
FIG. 3 is a schematic block diagram of the communication system of the human-powered vehicle illustrated in FIG. 1 (wired communication).

As seen in FIG. 3, the operated component S1 for the human-powered vehicle VH comprises a first wired communicator SD1 and a first wireless communicator SL1. The input component M1 includes a second wired communicator MD1 and a second wireless communicator ML1. The additional input component M2 comprises a third wired communicator MD2 and a third wireless communicator ML2. The additional operated component S2 comprises a fourth wired communicator SD2 and a fourth wireless communicator SL2. The operated component S1 further comprises an additional wired communicator SD3. In the present embodiment, the additional wired communicator SD3 is mounted to the electric power source PS. However, the additional wired communicator SD3 can be mounted to other components.

The first wired communicator SD1, the second wired communicator MD1, the third wired communicator MD2, the fourth wired communicator SD2, and the additional wired communicator SD3 are configured to be connected to each other with the electric wiring structure WS. In the present embodiment, the second wired communicator MD1 is electrically connected to the junction J1 with the electric cable C1. The third wired communicator MD2 is electrically connected to the junction J1 with the electric cable C2. The junction J1 is electrically connected to the junction J2 with the electric cable C3. The junction J2 is electrically connected to the first wired communicator SD1 with the electric cable C4. The junction J2 is electrically connected to the fourth wired communicator SD2 with the electric cable C5. The junction J2 is electrically connected to the additional wired communicator SD3 and the electric power source PS with the electric cable C6.

The second wired communicator MD1 is configured to communicate with the additional wired communicator SD3 via the wired communication channel. The second wired communicator MD1 is configured to transmit the control signal CS1 to the additional wired communicator SD3 via the wired communication channel. The wired signal DS includes the control signal CS1. The control signal CS1 can also be referred to as first control information CS1 included in the wired signal DS. Thus, the first control information CS1 includes the first control signal CS11 and the first additional control signal CS12.

The third wired communicator MD2 is configured to communicate with the additional wired communicator SD3 via the wired communication channel. The third wired communicator MD2 is configured to transmit the control signal CS2 to the additional wired communicator SD3 via the wired communication channel. The wired signal DS includes the control signal CS2. The control signal CS2 can also be referred to as first control information CS2 included in the wired signal DS. Thus, the first control information CS2 includes the second control signal CS21 and the second additional control signal CS22.

The first wired communicator SD1 is configured to communicate with at least one of the second wired communicator MD1 and the additional wired communicator SD3 via the wired communication channel. In the present embodiment, the first wired communicator SD1 is configured to communicate with the additional wired communicator SD3 via the wired communication channel. However, the first wired communicator SD1 can be configured to communicate with the second wired communicator MD1 or both the second wired communicator MD1 and the additional wired communicator SD3 via the wired communication channel.

The fourth wired communicator SD2 is configured to communicate with at least one of the second wired communicator MD1 and the additional wired communicator SD3 via the wired communication channel. In the present embodiment, the fourth wired communicator SD2 is configured to communicate with the additional wired communicator SD3 via the wired communication channel. However, the fourth wired communicator SD2 can be configured to communicate with the second wired communicator MD1 or both the second wired communicator MD1 and the additional wired communicator SD3 via the wired communication channel.

The additional wired communicator SD3 is configured to communicate with the first wired communicator SD1 via the wired communication channel. The additional wired communicator SD3 is configured to communicate with the second wired communicator MD1 via the wired communication channel. The additional wired communicator SD3 is configured to communicate with the third wired communicator MD2 via the wired communication channel. The additional wired communicator SD3 is configured to communicate with the fourth wired communicator SD2 via the wired communication channel.

The additional wired communicator SD3 is configured to receive the wired signal DS transmitted from the second wired communicator MD1 via the wired communication channel. The additional wired communicator SD3 is configured to receive the control signal CS1 transmitted from the second wired communicator MD1 via the wired communication channel. The additional wired communicator SD3 is configured to transmit the wired signal DS to the first wired communicator SD1 via the wired communication channel based on the control signal CS1.

The additional wired communicator SD3 is configured to receive the wired signal DS transmitted from the third wired communicator MD2 via the wired communication channel. The additional wired communicator SD3 is configured to receive the control signal CS2 transmitted from the third wired communicator MD2 via the wired communication channel. The additional wired communicator SD3 is configured to transmit the wired signal DS to the fourth wired communicator SD2 via the wired communication channel based on the control signal CS2.

The first wired communicator SD1 includes a first connection port SP1 to which an electric cable (e.g., the electric cable C5) is to be connected. The second wired communicator MD1 includes a second connection port MP1 to which an electric cable (e.g., the electric cable C1) is to be connected. The third wired communicator MD2 includes a third connection port MP3 to which an electric cable (e.g., the electric cable C2) is to be connected. The fourth wired communicator SD2 includes fourth connection ports SP2 to which an electric cable (e.g., the electric cable C6) is to be connected. The additional wired communicator SD3 includes an additional connection port SP3 to which an electric cable (e.g., the electric cable C4) is to be connected. The electric wiring structure WS is configured to be detachably connected to each of the first connection port SP1, the second connection ports MP1, the third connection ports MP2, the fourth connection port SP2, and the additional connection port SP3. The wired communication channel is established by the electric wiring structure WS, the first connection port SP1, the second connection ports MP1, the third connection ports MP2, the fourth connection port SP2, and the additional connection port SP3.

In the present embodiment, the wired communication channel is established using power line communication (PLC) technology. More specifically, the electric wiring structure WS includes a ground line and a voltage line. The PLC technology is used for communicating between electric components. The PLC carries data on a conductor that is also used simultaneously for electric power transmission or electric power distribution to the electric components. In the present embodiment, electricity is supplied from the electric power source PS through the electric wiring structure WS connected to the operated component S1, the input component M1, the additional input component M2, the additional operated component S2, and the additional wired communicator SD3. Furthermore, the operated component S1, the input component M1, the additional input component M2, the additional operated component S2, and the additional wired communicator SD3 are configured to receive signals from each other through the electric wiring structure WS using the PLC.

The PLC uses unique device identification (ID) that is assigned to an electric component such as the operated component S1, the input component M1, the additional input component M2, the additional operated component S2, and the additional wired communicator SD3. In the present embodiment, the first wired communicator SD1 is configured to store device information F1 including unique device ID assigned to the operated component S1. The second wired communicator MD1 is configured to store device information F2 including unique device ID assigned to the input component M1. The third wired communicator MD2 is configured to store device information F3 including unique device ID assigned to the additional input component M2. The fourth wired communicator SD2 is configured to store device information F4 including unique device ID assigned to the additional operated component S2. The additional wired communicator SD3 is configured to store device information F5 including unique device ID assigned to the additional wired communicator SD3 or the electric power source PS.

Based on the unique device ID, each of the operated component S1, the input component M1, the additional input component M2, the additional operated component S2, and the additional wired communicator SD3 is configured to recognize signals which are necessary for itself among signals transmitted via the wired communication channel. For example, the first wired communicator SD1 is configured to generate signals including the device information F1 indicating the operated component S1. The second wired communicator MD1 is configured to generate signals including the device information F2 indicating the input component M1. The third wired communicator MD2 is configured to generate signals including the device information F3 indicating the additional input component M2. The fourth wired communicator SD2 is configured to generate signals including the device information F4 indicating the additional operated component S2. The additional wired communicator SD3 is configured to generate signals including the device information F5 indicating the additional wired communicator SD3 or the electric power source PS.

One of the operated component S1, the input component M1, the additional input component M2, the additional operated component S2, and the additional wired communicator SD3 is configured to recognize signals transmitted from another of the operated component S1, the input component M1, the additional input component M2, the additional operated component S2, and the additional wired communicator SD3 based on the device information included in the signals.

The first wired communicator SD1 includes a filter SD11 and a voltage controller SD12. The filter SD11 is configured to separate input signals to a power source voltage and signals including device information. The voltage controller SD12 is configured to regulate the power source voltage to a level at which the operated component S1 can properly operate. The filter SD11 is further configured to superimpose output signals such as signals including the device information F1 on the power source voltage applied to the electric wiring structure WS from the electric power source PS.

The second wired communicator MD1 includes a filter MD11 and a voltage controller MD12. The filter MD11 is configured to separate input signals to a power source voltage and signals including device information. The voltage controller MD12 is configured to regulate the power source voltage to a level at which the input component M1 can properly operate. The filter MD11 is further configured to superimpose output signals such as signals including the device information F2 on the power source voltage applied to the electric wiring structure WS from the electric power source PS.

The third wired communicator MD2 includes a filter MD21 and a voltage controller MD22. The filter MD21 is configured to separate input signals to a power source voltage and signals including device information. The voltage controller MD22 is configured to regulate the power source voltage to a level at which the additional input component M2 can properly operate. The filter MD21 is further configured to superimpose output signals such as signals including the device information F3 on the power source voltage applied to the electric wiring structure WS from the electric power source PS.

The fourth wired communicator SD2 includes a filter SD21 and a voltage controller SD22. The filter SD21 is configured to separate input signals to a power source voltage and signals including device information. The voltage controller SD22 is configured to regulate the power source voltage to a level at which the additional operated component S2 can properly operate. The filter SD21 is further configured to superimpose output signals such as signals including the device information F4 on the power source voltage applied to the electric wiring structure WS from the electric power source PS.

The additional wired communicator SD3 includes a filter SD31 and a voltage controller SD32. The filter SD31 is configured to separate input signals to a power source voltage and signals including device information. The voltage controller SD32 is configured to regulate the power source voltage to a level at which the additional wired communicator SD3 can properly operate. The filter SD31 is further configured to superimpose output signals such as signals including the device information F5 on the power source voltage applied to the electric wiring structure WS from the electric power source PS.

Figure 4:
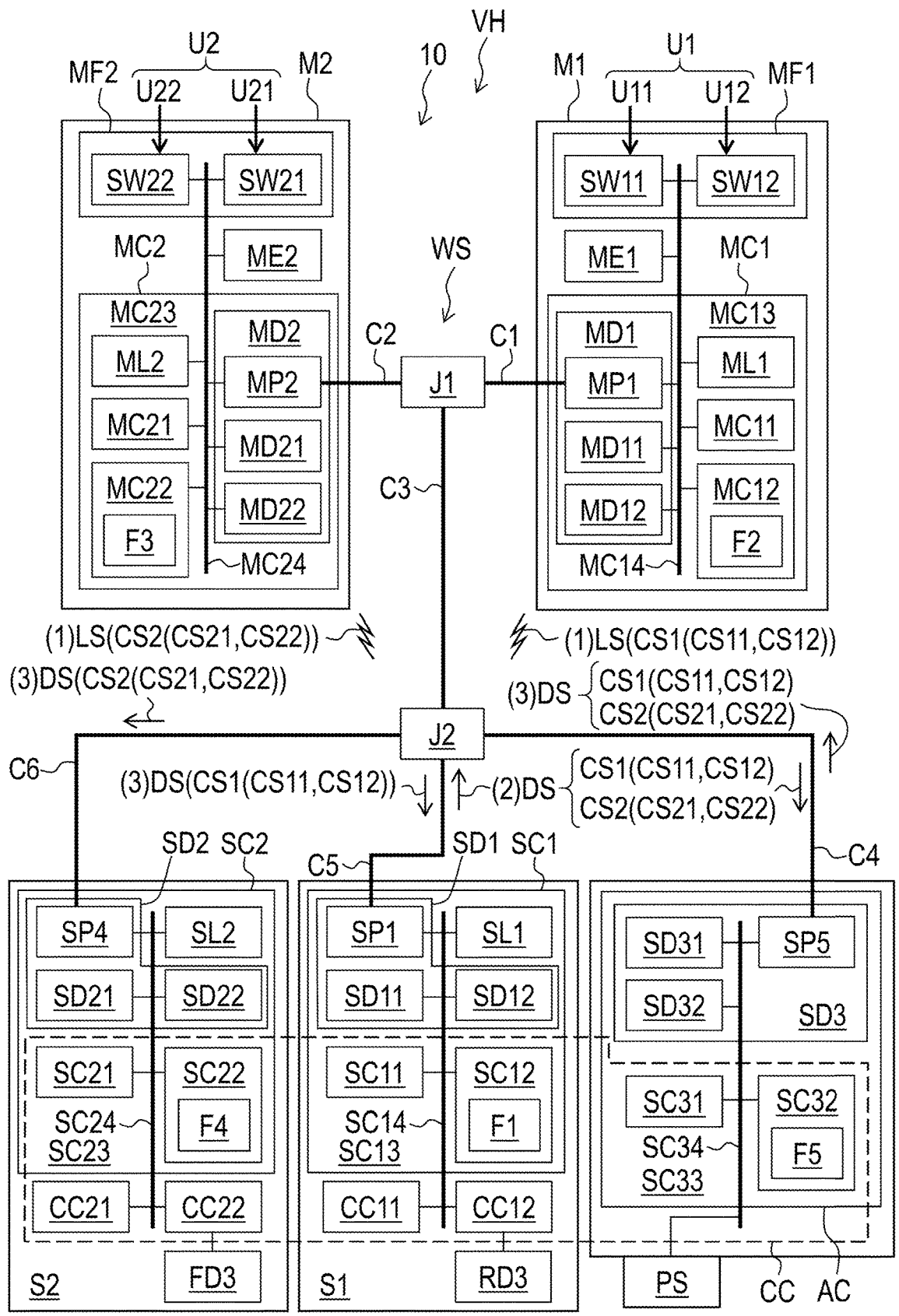
FIG. 4 is another schematic block diagram of the communication system of the human-powered vehicle illustrated in FIG. 1 (wireless communication).

As seen in FIG. 4, the first wireless communicator SL1 includes a signal transmitting circuit, a signal receiving circuit, and an antenna. The first wireless communicator SL1 is configured to superimpose digital signals on carrier wave using a predetermined wireless communication protocol to wirelessly transmit the digital signal. In the present embodiment, the first wireless communicator SL1 is configured to encrypt signals using a cryptographic key to generate encrypted wireless signals. The first wireless communicator SL1 is configured to receive a wireless signal via the antenna. In the present embodiment, the first wireless communicator SL1 is configured to decode the wireless signal to recognize signals and/or information wirelessly transmitted from another wireless communicator. The first wireless communicator SL1 is configured to decrypt the wireless signal using the cryptographic key. The first wireless communicator SL1 can also be referred to as a first wireless communication circuit or circuitry SL1.

The second wireless communicator ML1 includes a signal transmitting circuit, a signal receiving circuit, and an antenna. The second wireless communicator ML1 is configured to superimpose digital signals on carrier wave using a predetermined wireless communication protocol to wirelessly transmit the digital signal. In the present embodiment, the second wireless communicator ML1 is configured to encrypt signals using a cryptographic key to generate encrypted wireless signals. The second wireless communicator ML1 is configured to receive a wireless signal via the antenna. In the present embodiment, the second wireless communicator ML1 is configured to decode the wireless signal to recognize signals and/or information wirelessly transmitted from another wireless communicator. The second wireless communicator ML1 is configured to decrypt the wireless signal using the cryptographic key. The second wireless communicator ML1 can also be referred to as a second wireless communication circuit or circuitry ML1.

The third wireless communicator ML2 includes a signal transmitting circuit, a signal receiving circuit, and an antenna. The third wireless communicator ML2 is configured to superimpose digital signals on carrier wave using a predetermined wireless communication protocol to wirelessly transmit the digital signal. In the present embodiment, the third wireless communicator ML2 is configured to encrypt signals using a cryptographic key to generate encrypted wireless signals. The third wireless communicator ML2 is configured to receive a wireless signal via the antenna. In the present embodiment, the third wireless communicator ML2 is configured to decode the wireless signal to recognize signals and/or information wirelessly transmitted from another wireless communicator. The third wireless communicator ML2 is configured to decrypt the wireless signal using the cryptographic key. The third wireless communicator ML2 can also be referred to as a third wireless communication circuit or circuitry ML2.

As seen in FIG. 4, the first wireless communicator SL1 is configured to communicate with the second wireless communicator ML1 via the wireless communication channel. The second wireless communicator ML1 is configured to communicate with the first wireless communicator SL1 via the wireless communication channel. The second wireless communicator ML1 is configured to transmit the control signal CS1 to the first wireless communicator SL1 via the wireless communication channel. The wireless signal LS includes the control signal CS1. The control signal CS1 can also be referred to as second control information CS1 included in the wireless signal LS. Thus, the second control information CS1 includes the first control signal CS11 and the first additional control signal CS12.

The first wireless communicator SL1 is configured to communicate with the third wireless communicator ML2 via the wireless communication channel. The third wireless communicator ML2 is configured to communicate with the first wireless communicator SL1 via the wireless communication channel. The third wireless communicator ML2 is configured to transmit the control signal CS2 to the first wireless communicator SL1 via the wireless communication channel The wireless signal LS includes the control signal CS2. The control signal CS2 can also be referred to as second control information CS2 included in the wireless signal LS. Thus, the second control information CS2 includes the second control signal CS21 and the second additional control signal CS22.

The operated component S1 includes a first controller SC1 configured to control the first wired communicator SD1 and the first wireless communicator SL1. The first controller SC1 includes a processor SC11, a memory SC12, a circuit board SC13, and a system bus SC14. The processor SC11 and the memory SC12 are electrically mounted on the circuit board SC13. The processor SC11 includes a central processing unit (CPU) and a memory controller. The processor SC11 is electrically connected to the memory SC12 with the circuit board SC13 and the system bus SC14. The first wired communicator SD1 and the first wireless communicator SL1 are configured to be electrically mounted on the circuit board SC13. Each of the first wired communicator SD1 and the first wireless communicator SL1 is electrically connected to the processor SC11 and the memory SC12 with the circuit board SC13 and the system bus SC14.

The memory SC12 includes a read only memory (ROM) and a random-access memory (RAM). The memory SC12 includes storage areas each having an address in the ROM and the RAM. The processor SC11 is configured to control the memory SC12 to store data in the storage areas of the memory SC12 and reads data from the storage areas of the memory SC12. The memory SC12 (e.g., the ROM) stores a program. The program is read into the processor SC11, and thereby the configuration and/or algorithm of the operated component Si is performed.

In the present embodiment, the first wired communicator SD1 and the first wireless communicator SL1 are configured to be integrally provided with a single unit and configured to be provided as a separate unit from the additional wired communicator SD3. The first wired communicator SD1, the first wireless communicator SL1, and the first controller SC1 are configured to be integrally provided with a single unit and configured to be provided as a separate unit from the additional wired communicator SD3. The first wired communicator SD1, the first wireless communicator SL1 are provided in a position different from a position of the additional wired communicator SD3. However, the first wired communicator SD1, the first wireless communicator SL1, and the first controller SC1 can be configured to be a separate unit from each other. At least one of the first wired communicator SD1, the first wireless communicator SL1, and the first controller SC1 can be configured to be integrally provided with the additional wired communicator SD3.

In the present embodiment, the first wireless communicator SL1 is configured to be electrically connected to the first wired communicator SD1 without an electric cable. The first wireless communicator SL1 is configured to be electrically connected to the first wired communicator SD1 through the circuit board SC13 and the system bus SC14 without an electric cable such as the electric cables C1 to C6. However, the first wireless communicator SL1 can be configured to be electrically connected to the first wired communicator SD1 with an electric cable instead of or in addition to the circuit board SC13 and the system bus SC14.

The input component M1 includes a second controller MC1 configured to control the second wired communicator MD1 and the second wireless communicator ML1. The second controller MC1 includes a processor MC11, a memory MC12, a circuit board MC13, and a system bus MC14. The processor MC11 and the memory MC12 are electrically mounted on the circuit board MC13. The processor MC11 includes a CPU and a memory controller. The processor MC11 is electrically connected to the memory MC12 with the circuit board MC13 and the system bus MC14. The second wired communicator MD1 and the second wireless communicator ML1 are configured to be electrically mounted on the circuit board MC13. Each of the second wired communicator MD1 and the second wireless communicator ML1 is electrically connected to the processor MC11 and the memory MC12 with the circuit board MC13 and the system bus MC14.

The memory MC12 includes a ROM and a RAM. The memory MC12 includes storage areas each having an address in the ROM and the RAM. The processor MC11 is configured to control the memory MC12 to store data in the storage areas of the memory MC12 and reads data from the storage areas of the memory MC12. The memory MC12 (e.g., the ROM) stores a program. The program is read into the processor MC11, and thereby the configuration and/or algorithm of the input component M1 is performed.

The additional input component M2 includes a third controller MC2 configured to control the third wired communicator MD2 and the third wireless communicator ML2. The third controller MC2 includes a processor MC21, a memory MC22, a circuit board MC23, and a system bus MC24. The processor MC21 and the memory MC22 are electrically mounted on the circuit board MC23. The processor MC21 includes a CPU and a memory controller. The processor MC21 is electrically connected to the memory MC22 with the circuit board MC23 and the system bus MC24. The third wired communicator MD2 and the third wireless communicator ML2 are configured to be electrically mounted on the circuit board MC23. Each of the third wired communicator MD2 and the third wireless communicator ML2 is electrically connected to the processor MC21 and the memory MC22 with the circuit board MC23 and the system bus MC24.

The memory MC22 includes a ROM and a RAM. The memory MC22 includes storage areas each having an address in the ROM and the RAM. The processor MC21 is configured to control the memory MC22 to store data in the storage areas of the memory MC22 and reads data from the storage areas of the memory MC22. The memory MC22 (e.g., the ROM) stores a program. The program is read into the processor MC21, and thereby the configuration and/or algorithm of the additional input component M2 is performed.

The additional operated component S2 includes a fourth controller SC2 configured to control the fourth wired communicator SD2 and the fourth wireless communicator SL2. The fourth controller SC2 includes a processor SC21, a memory SC22, a circuit board SC23, and a system bus SC24. The processor SC21 and the memory SC22 are electrically mounted on the circuit board SC23. The processor SC21 includes a CPU and a memory controller. The processor SC21 is electrically connected to the memory SC22 with the circuit board SC23 and the system bus SC24. The fourth wired communicator SD2 and the fourth wireless communicator SL2 are configured to be electrically mounted on the circuit board SC23. Each of the fourth wired communicator SD2 and the fourth wireless communicator SL2 is electrically connected to the processor SC21 and the memory SC22 with the circuit board SC23 and the system bus SC24.

The memory SC22 includes a ROM and a RAM. The memory SC22 includes storage areas each having an address in the ROM and the RAM. The processor SC21 is configured to control the memory SC22 to store data in the storage areas of the memory SC22 and reads data from the storage areas of the memory SC22. The memory SC22 (e.g., the ROM) stores a program. The program is read into the processor SC21, and thereby the configuration and/or algorithm of the additional operated component S2 is performed.

In the present embodiment, the fourth wired communicator SD2 and the fourth wireless communicator SL2 are configured to be integrally provided with a single unit and configured to be provided as a separate unit from the additional wired communicator SD3. The fourth wired communicator SD2, the fourth wireless communicator SL2, and the fourth controller SC2 are configured to be integrally provided with a single unit and configured to be provided as a separate unit from the additional wired communicator SD3. The fourth wired communicator SD2, the fourth wireless communicator SL2 are provided in a position different from a position of the additional wired communicator SD3. However, the fourth wired communicator SD2, the fourth wireless communicator SL2, and the fourth controller SC2 can be configured to be a separate unit from each other. At least one of the fourth wired communicator SD2, the fourth wireless communicator SL2, and the fourth controller SC2 can be configured to be integrally provided with the additional wired communicator SD3.

In the present embodiment, the fourth wireless communicator SL2 is configured to be electrically connected to the fourth wired communicator SD2 without an electric cable. The fourth wireless communicator SL2 is configured to be electrically connected to the fourth wired communicator SD2 through the circuit board SC13 and the system bus SCl4 without an electric cable such as the electric cables Cl to C6. However, the fourth wireless communicator SL2 can be configured to be electrically connected to the fourth wired communicator SD2 with an electric cable instead of or in addition to the circuit board SC13 and the system bus SC14.

As seen in FIG. 3, the operated component Si further comprises a component controller CC. The component controller CC includes the first controller SC1 and the fourth controller SC2. The component controller CC is configured to control the electric actuator RD3 to move the movable member RD2 relative to the base member RD1. The component controller CC is configured to control the electric actuator FD3 to move the movable member FD2 relative to the base member FD1. The component controller CC is configured to be electrically connected to the first wired communicator SD1, the second wired communicator MD1, the third wired communicator MD2, the fourth wired communicator SD2, and the additional wired communicator SD3.

The component controller CC includes an actuation controller AC. The actuation controller AC is electrically connected to the additional wired communicator SD3. The actuation controller AC includes a processor SC31, a memory SC32, a circuit board SC33, and a system bus SC34. The processor SC31 and the memory SC32 are electrically mounted on the circuit board SC33. The additional wired communicator SD3 is electrically mounted on the circuit board SC33. The processor SC31 includes a CPU and a memory controller. The processor SC31 is electrically connected to the memory SC32 with the circuit board SC33 and the system bus SC34. The filter SD31 and the voltage controller SD32 are configured to be electrically mounted on the circuit board SC33. Each of the filter SD31 and the voltage controller SD32 is electrically connected to the processor SC31 and the memory SC32 with the circuit board SC33 and the system bus SC34.

The memory SC32 includes a ROM and a RAM. The memory SC32 includes storage areas each having an address in the ROM and the RAM. The processor SC31 is configured to control the memory SC32 to store data in the storage areas of the memory SC32 and reads data from the storage areas of the memory SC32. The memory SC32 (e.g., the ROM) stores a program. The program is read into the processor SC31, and thereby the configuration and/or algorithm of the component controller CC is performed.

The component controller CC includes a position sensor CC11 and an actuator driver CC12. The position sensor CC11 and the actuator driver CC12 are provided in the operated component S1. The position sensor CC11 and the actuator driver CC12 are electrically connected to the first wired communicator SD1. The position sensor CC11 and the actuator driver CC12 are electrically connected to the circuit board SC13 and/or the system bus SC14. Thus, the position sensor CC11 and the actuator driver CC12 are configured to be electrically connected to the actuation controller AC via the first wired communicator SD1 and the additional wired communicator SD3.

The electric actuator RD3 includes a rotational shaft operatively coupled to the movable member RD2. The position sensor CC11 is configured to sense a current gear position of the operated component S1. Examples of the position sensor CC11 include a potentiometer and a rotary encoder. The position sensor CC11 is configured to sense an absolute rotational position of the rotational shaft of the electric actuator RD3 as the current gear position of the operated component S1. The electric actuator RD3 and the position sensor CC11 are electrically connected to the actuator driver CC12.

The actuator driver CC12 is electrically connected to the electric actuator RD3 to control the electric actuator RD3 based on the control signals CS11 and CS12 received by the first wired communicator SD1. The electric component RD is configured to upshift in response to the control signal CS11. The electric component RD is configured to downshift in response to the control signal CS12.

The component controller CC includes a position sensor CC21 and an actuator driver CC22. The position sensor CC21 and the actuator driver CC22 are provided in the additional operated component S2. The position sensor CC21 and the actuator driver CC22 are electrically connected to the fourth wired communicator SD2. The position sensor CC21 and the actuator driver CC22 are electrically connected to the circuit board SC13 and/or the system bus SC14. Thus, the position sensor CC21 and the actuator driver CC22 are configured to be electrically connected to the actuation controller AC via the fourth wired communicator SD2 and the additional wired communicator SD3.

The electric actuator FD3 includes a rotational shaft operatively coupled to the movable member FD2. The position sensor CC21 is configured to sense a current gear position of the additional operated component S2. Examples of the position sensor CC21 include a potentiometer and a rotary encoder. The position sensor CC21 is configured to sense an absolute rotational position of the rotational shaft of the electric actuator FD3 as the current gear position of the additional operated component S2. The electric actuator FD3 and the position sensor CC21 are electrically connected to the actuator driver CC22.

The actuator driver CC22 is electrically connected to the electric actuator FD3 to control the electric actuator FD3 based on the control signals CS21 and CS22 received by the fourth wired communicator SD2. The additional electric component FD is configured to upshift in response to the control signal CS21. The additional electric component FD is configured to downshift in response to the control signal CS22.

As seen in FIG. 3, the input component M1 includes a first electric power source ME1 configured to supply electric power to the second wired communicator MD1 and the second wireless communicator ML1. The second wired communicator MD1 is configured to receive electric power supply from the first electric power source ME1. The second wireless communicator ML1 is configured to receive electric power supply from the first electric power source ME1. Examples of the first electric power source ME1 includes a primary battery and a secondary battery.

The additional input component M2 includes a second electric power source ME2 configured to supply electric power to the third wired communicator MD2 and the third wireless communicator ML2. The third wired communicator MD2 is configured to receive electric power supply from the second electric power source ME2. The third wireless communicator ML2 is configured to receive electric power supply from the second electric power source ME2. Examples of the second electric power source ME2 includes a primary battery and a secondary battery.

The second wired communicator MD1 is configured to receive electric power supply from the additional electric power source PS different from the first electric power source ME1. The additional electric power source PS is a separate electric power source from the first electric power source ME1.

The first wired communicator SD1 is configured to receive electric power supply from the additional electric power source PS. The first wireless communicator SL1 is configured to receive electric power supply from the additional electric power source PS. The first wired communicator SD1 is configured to receive electric power supply from the additional electric power source PS via the electric wiring structure WS. The first wireless communicator SL1 is configured to receive electric power supply from the additional electric power source PS via the electric wiring structure WS.

As seen in FIG. 3, the second wired communicator MD1 is configured to transmit, to the additional wired communicator SD3, the first control information CS1 included in the wired signal DS transmitted via the wired communication channel. The additional wired communicator SD3 is configured to transmit, to the first wired communicator SD1, the first control information CS1 included in the wired signal DS transmitted via the wired communication channel The component controller CC is configured to control the electric actuator RD3 to move the movable member RD2 relative to the base member RD1 based on the first control information CS1.

The second wired communicator MD1 is configured to transmit, to the additional wired communicator SD3, the first control signal CS11 included in the first control information CS1 of the wired signal DS transmitted via the wired communication channel ("(1)" in FIG. 3). The additional wired communicator SD3 is configured to transmit, to the first wired communicator SD1, the first control signal CS11 included in the first control information CS1 of the wired signal DS transmitted via the wired communication channel in response to the receipt of the first control information C S1 of the wired signal DS ("(2)" in FIG. 3). The component controller CC is configured to control the electric actuator RD3 to move the movable member RD2 relative to the base member RD1 in an upshifting direction based on the first control signal CS11 of the first control information CS1 of the wired signal DS.

The second wired communicator MD1 is configured to transmit, to the additional wired communicator SD3, the first additional control signal CS12 included in the first control information CS1 of the wired signal DS transmitted via the wired communication channel ("(1)" in FIG. 3). The additional wired communicator SD3 is configured to transmit, to the first wired communicator SD1, the first additional control signal CS12 included in the first control information CS1 of the wired signal DS transmitted via the wired communication channel in response to the receipt of the first control information CS2 of the wired signal DS ("(2)" in FIG. 3). The component controller CC is configured to control the electric actuator RD3 to move the movable member RD2 relative to the base member RD1 in a downshifting direction based on the first additional control signal CS12 of the first control information CS1 of the wired signal DS.

As seen in FIG. 4, the second wireless communicator ML1 is configured to transmit, to the first wireless communicator SL1, the second control information CS1 included in the wireless signal LS transmitted via the wireless communication channel. The first wireless communicator SL1 is configured to transmit, to the first wired communicator SD1, the second control information CS1 included in the wireless signal LS transmitted via the wireless communication channel. The first wired communicator SD1 is configured to transmit the second control information CS1 to the additional wired communicator SD3 via the wired communication channel. The component controller CC is configured to control the electric actuator RD3 to move the movable member RD2 relative to the base member RD1 based on the second control information CS1.

The second wireless communicator ML1 is configured to transmit, to the first wireless communicator SL1, the first control signal CS11 included in the second control information CS1 of the wireless signal LS transmitted via the wireless communication channel ("(1)" in FIG. 4). The first wireless communicator SL1 is configured to transmit, to the first wired communicator SD1, the first control signal CS11 included in the second control information CS1 in response to the receipt of the second control information CS1 of the wireless signal LS. The first wired communicator SD1 is configured to transmit, to the additional wired communicator SD3, the first control signal CS11 included in the second control information CS1 as the wired signal DS via the wired communication channel in response to the receipt of the second control information CS1 ("(2)" in FIG. 4). The component controller CC is configured to control the electric actuator RD3 to move the movable member RD2 relative to the base member RD1 in the upshifting direction based on the first control signal CS11 included in the second control information CS1.

Furthermore, the additional wired communicator SD3 is configured to transmit, to the first wired communicator SD1, the first control information CS1 or other information included in the wired signal DS transmitted via the wired communication channel in response to the receipt of the first control information CS1 ("(3)" in FIG. 4). The first controller SCl is configured to store the information transmitted from the additional wired communicator SD3 for controlling the electric component RD.

The second wireless communicator ML1 is configured to transmit, to the first wireless communicator SL1, the first additional control signal CS12 included in the second control information CS1 of the wireless signal LS transmitted via the wireless communication channel ("(1)" in FIG. 4). The first wireless communicator SL1 is configured to transmit, to the first wired communicator SD1, the first additional control signal CS12 included in the second control information CS1 in response to the receipt of the second control information CS1 of the wireless signal LS. The first wired communicator SD1 is configured to transmit, to the additional wired communicator SD3, the first additional control signal CS12 included in the second control information CS1 as the wired signal DS via the wired communication channel in response to the receipt of the second control information CS1 ("(2)" in FIG. 4). The component controller CC is configured to control the electric actuator RD3 to move the movable member RD2 relative to the base member RD1 in the downshifting direction based on the first additional control signal CS12 included in the second control information CS1.

Furthermore, the additional wired communicator SD3 is configured to transmit, to the first wired communicator SD1, the first control information CS1 or other information included in the wired signal DS transmitted via the wired communication channel in response to the receipt of the first control information CS1 ("(3)" in FIG. 4). The first controller SC1 is configured to store the information transmitted from the additional wired communicator SD3 for controlling the electric component RD.

As seen in FIG. 3, the third wired communicator MD2 is configured to transmit, to the additional wired communicator SD3, the first control information CS2 included in the wired signal DS transmitted via the wired communication channel. The additional wired communicator SD3 is configured to transmit, to the fourth wired communicator SD2, the first control information CS2 included in the wired signal DS transmitted via the wired communication channel. The component controller CC is configured to control the electric actuator FD3 to move the movable member FD2 relative to the base member FD1 based on the first control information CS2.

The third wired communicator MD2 is configured to transmit, to the additional wired communicator SD3, the second control signal CS21 included in the first control information CS2 of the wired signal DS transmitted via the wired communication channel. The additional wired communicator SD3 is configured to transmit, to the fourth wired communicator SD2, the second control signal CS21 included in the first control information CS2 of the wired signal DS transmitted via the wired communication channel. The component controller CC is configured to control the electric actuator FD3 to move the movable member FD2 relative to the base member FD1 in an upshifting direction based on the second control signal CS21 of the first control information CS2 of the wired signal DS.

The third wired communicator MD2 is configured to transmit, to the additional wired communicator SD3, the second additional control signal CS22 included in the first control information CS2 of the wired signal DS transmitted via the wired communication channel. The additional wired communicator SD3 is configured to transmit, to the fourth wired communicator SD2, the second additional control signal CS22 included in the first control information CS2 of the wired signal DS transmitted via the wired communication channel. The component controller CC is configured to control the electric actuator FD3 to move the movable member FD2 relative to the base member FD1 in a downshifting direction based on the second additional control signal CS22 of the first control information CS2 of the wired signal DS.

As seen in FIG. 4, the third wireless communicator ML2 is configured to transmit, to the first wireless communicator SL1, the second control information CS2 included in the wireless signal LS transmitted via the wireless communication channel The first wireless communicator SL1 is configured to transmit, to the first wired communicator SD1, the second control information CS2 included in the wireless signal LS transmitted via the wireless communication channel The first wired communicator SD1 is configured to transmit the second control information CS2 to the additional wired communicator SD3 via the wired communication channel. The additional wired communicator SD3 is configured to transmit the second control information CS2 to the fourth wired communicator SD2 via the wired communication channel. The component controller CC is configured to control the electric actuator FD3 to move the movable member FD2 relative to the base member FD1 based on the second control information CS2.

The third wireless communicator ML2 is configured to transmit, to the first wireless communicator SL1, the second control signal CS21 included in the second control information CS2 of the wireless signal LS transmitted via the wireless communication channel ("(1)" in FIG. 4). The first wireless communicator SL1 is configured to transmit, to the first wired communicator SD1, the second control signal CS21 included in the second control information CS2 in response to the receipt of the second control information CS2 of the wireless signal LS. The first wired communicator SD1 is configured to transmit, to the additional wired communicator SD3, the second control signal CS21 included in the second control information CS2 as the wired signal DS via the wired communication channel in response to the receipt of the second control information CS2 ("(2)" in FIG. 4). The additional wired communicator SD3 is configured to transmit, to the fourth wired communicator SD2, the second control signal CS21 included in the second control information CS2 as the wired signal DS via the wired communication channel in response to the receipt of the second control information CS2 ("(3)" in FIG. 4). The component controller CC is configured to control the electric actuator FD3 to move the movable member FD2 relative to the base member FD1 in the upshifting direction based on the second control signal CS21 included in the second control information CS2.

The third wireless communicator ML2 is configured to transmit, to the first wireless communicator SL1, the second additional control signal CS22 included in the second control information CS2 of the wireless signal LS transmitted via the wireless communication channel ("(1)" in FIG. 4). The first wireless communicator SL1 is configured to transmit, to the first wired communicator SD1, the second additional control signal CS22 included in the second control information CS2 in response to the receipt of the second control information CS2 of the wireless signal LS. The first wired communicator SD1 is configured to transmit, to the additional wired communicator SD3, the second additional control signal CS22 included in the second control information CS2 as the wired signal DS via the wired communication channel in response to the receipt of the second control information CS2 ("(2)" in FIG. 4). The additional wired communicator SD3 is configured to transmit, to the fourth wired communicator SD2, the second additional control signal CS22 included in the second control information CS2 as the wired signal DS via the wired communication channel in response to the receipt of the second control information CS2 ("(3)" in FIG. 4). The component controller CC is configured to control the electric actuator FD3 to move the movable member FD2 relative to the base member FD1 in the downshifting direction based on the second additional control signal CS22 included in the second control information CS2.

As seen in FIGS. 3 and 4, the second controller MC1 is configured to select at least one of the second wired communicator MD1 and the second wireless communicator ML1. In the present embodiment, the second controller MC1 is configured to select the second wired communicator MD1 if the wired communication is available. The second controller MC1 is configured to select the second wireless communicator ML1 if the wired communication is not available and the wireless communication is available. For example, the second controller MC1 is configured to select the second wired communicator MD1 if the input component M1 receives the electric power supply from the electric power source PS. The second controller MC1 is configured to select the second wireless communicator ML1 if the input component M1 does not receive the electric power supply from the electric power source PS but receives the electric power supply from the first electric power source ME1.

Thus, the second wired communicator MD1 is configured to transmit the wired signal DS via the wired communication channel if the input component M1 receives the electric power supply from the electric power source PS. The second wireless communicator ML1 is configured not to transmit the wireless signal LS via the wireless communication channel if the input component M1 receives the electric power supply from the electric power source PS. The second wireless communicator ML1 is configured to transmit the wireless signal LS via the wireless communication channel if the input component M1 does not receive the electric power supply from the electric power source PS but receives the electric power supply from the first electric power source ME1. The second wired communicator MD1 is configured not to transmit the wired signal DS via the wired communication channel if the input component M1 does not receive the electric power supply from the electric power source PS but receives the electric power supply from the first electric power source ME1.

As with the second controller MC1, the third controller MC2 is configured to select at least one of the third wired communicator MD2 and the third wireless communicator ML2. In the present embodiment, the third controller MC2 is configured to select the third wired communicator MD2 if the wired communication is available. The third controller MC2 is configured to select the third wireless communicator ML2 if the wired communication is not available and the wireless communication is available. For example, the third controller MC2 is configured to select the third wired communicator MD2 if the additional input component M2 receives the electric power supply from the electric power source PS. The third controller MC2 is configured to select the third wireless communicator ML2 if the additional input component M2 does not receive the electric power supply from the electric power source PS but receives the electric power supply from the first electric power source ME1.

Thus, the third wired communicator MD2 is configured to transmit the wired signal DS via the wired communication channel if the additional input component M2 receives the electric power supply from the electric power source PS. The third wireless communicator ML2 is configured not to transmit the wireless signal LS via the wireless communication channel if the additional input component M2 receives the electric power supply from the electric power source PS. The third wireless communicator ML2 is configured to transmit the wireless signal LS via the wireless communication channel if the additional input component M2 does not receive the electric power supply from the electric power source PS but receives the electric power supply from the second electric power source ME2. The third wired communicator MD2 is configured not to transmit the wired signal DS via the wired communication channel if the additional input component M2 does not receive the electric power supply from the electric power source PS but receives the electric power supply from the second electric power source ME2.

Figure 5:
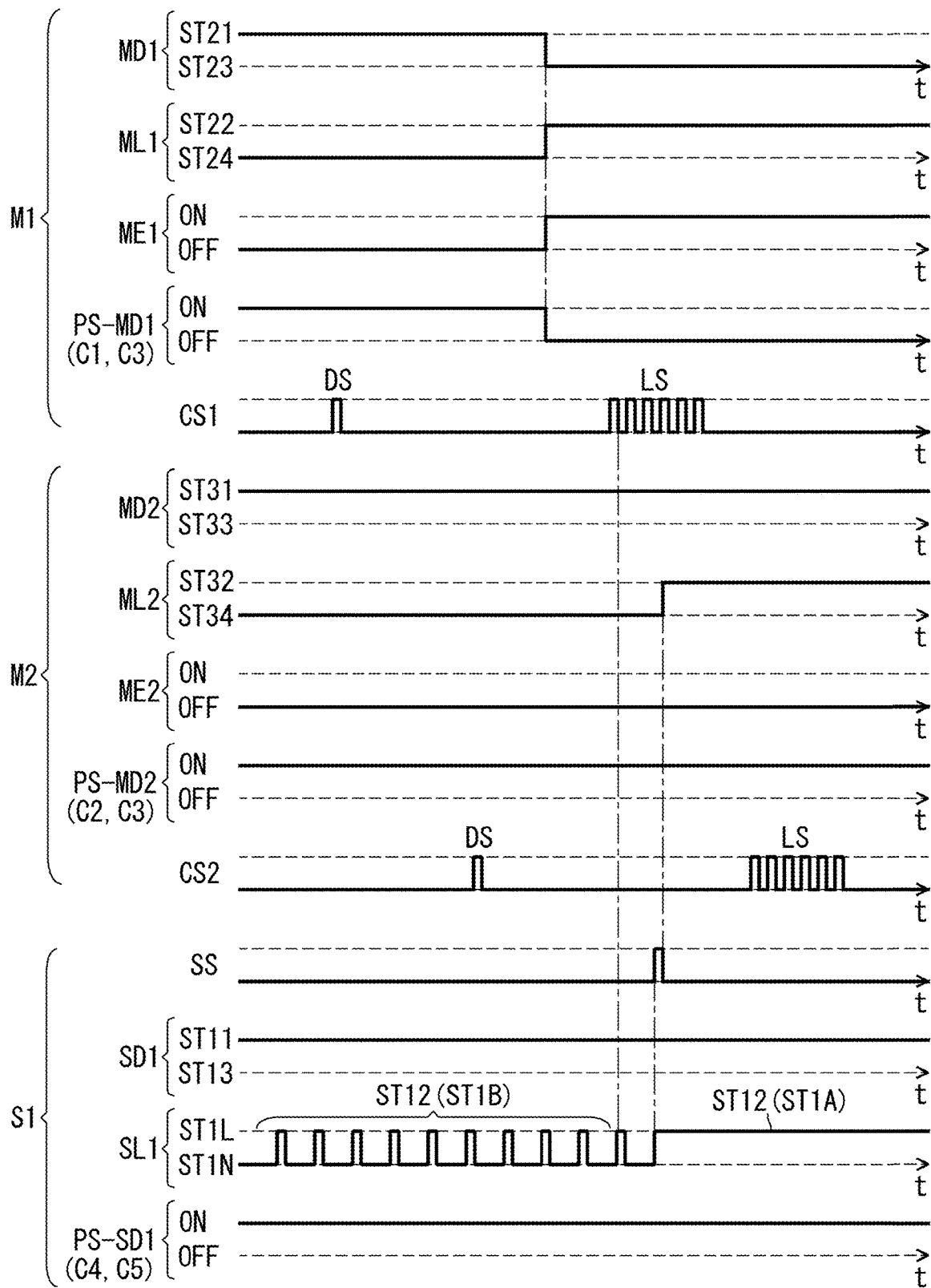
FIGS. 5 to 8 are timing charts of the communication system of the human-powered vehicle illustrated in FIG. 1 (wired communication).

As seen in FIG. 5, the first wired communicator SD1 has a first wired communication state ST11 in which the first wired communicator SD1 is configured to recognize the wired signal DS transmitted via the wired communication channel. The first wired communicator SD1 is configured to transmit and/or recognize the wired signal DS in the first wired communication state ST11. In the present embodiment, the first wired communicator SD1 recognizes the wired signal DS including the control signal CS1 (e.g., the first control signal CS11 and/or the first additional control signal CS12) transmitted from the additional wired communicator SD3 in the first wired communication state ST11. For example, the first wired communicator SD1 is in the first wired communication state ST11 if the second wired communicator MD1 is electrically connected to the additional wired communicator SD3 and the electric power source PS and the first wired communicator SD1 is electrically connected to the additional wired communicator SD3 and the electric power source PS via the electric wiring structure WS.

The first wired communicator SD1 has a first non-wired communication state ST13 in which the first wired communicator SD1 is configured not to recognize the wired signal DS. The first non-wired communication state ST13 includes a state where the first wired communicator SD1 is configured not to recognize the wired signal DS, where the first wired communicator SD1 is configured to recognize the wired signal DS but not to respond, and/or where the first wired communicator SD1 is turned off.

The first wired communicator SD1 is configured to be in the first wired communication state ST11 in response to the electric power supply from the additional electric power source PS. The first controller SC1 is configured to control the first wired communicator SD1 to be in the first wired communication state ST11 when the first wired communicator SD1 starts to receive the electric power supply from the additional electric power source PS. The first controller SC1 is configured to control the first wired communicator SD1 to maintain the first wired communication state ST11 while the first wired communicator SD1 receives the electric power supply from the additional electric power source PS.

The first wireless communicator SL1 has a first wireless communication state ST12 in which the first wireless communicator SL1 is configured to recognize the wireless signal LS transmitted via the wireless communication channel. In the first wireless communication state ST12, for example, the first wireless communicator SL1 is configured to recognize the wireless signal LS including the control signal CS1 (e.g., the first control signal CS11 and/or the first additional control signal CS12) transmitted from the second wireless communicator ML1 and/or the third wireless communicator ML2 via the wireless communication channel. In the first wireless communication state ST12, the first wireless communicator SL1 is configured to receive the wireless signal LS via the wireless communication channel.

In the present embodiment, the first wireless communicator SL1 has a listen condition ST1L in which the first wireless communicator SL1 is configured to recognize the wireless signal LS. The first wireless communicator SL1 has a non-listen condition ST1N in which the first wireless communicator SL1 is configured not to recognize the wireless signal LS. The first wireless communication state ST12 includes at least one of a continuous listen state ST1A in which the listen condition ST1L is continuously maintained without the non-listen condition ST1N, and an intenmittent listen state ST1B in which the listen condition ST1L and the non-listen condition ST1N are alternately repeated.

The first wireless communicator SL1 can have a continuous non-listen state in which the non-listen condition ST1N is continuously maintained without the listen condition ST1L. The continuous non-listen state includes a state where the first wireless communicator SL1 is configured not to recognize the wireless signal LS, a state where the first wired communicator SD1 is configured to recognize the wireless signal LS but not to respond, and/or a state where the first wired communicator SD1 is turned off.

The non-listen condition ST1N has power condition lower than power consumption of the listen condition ST1L. The intermittent listen state ST1B has power condition lower than power consumption of the continuous listen state ST1A. The continuous non-listen state ST1C has power condition lower than power consumption of the continuous listen state ST1A and the intermittent listen state ST1B.

The first wireless communicator SL1 is configured to be in the first wireless communication state ST12 while the first wired communicator SD1 is in the first wired communication state ST11. The first wireless communicator SL1 is configured to be in at least one of the continuous listen state ST1A and the intermittent listen state ST1B while the first wired communicator SD1 is in the first wired communication state ST11.

In the present embodiment, the first wireless communicator SL1 is configured to be in one of the continuous listen state ST1A and the intermittent listen state ST1B while the first wired communicator SD1 is in the first wired communication state ST11. The first wireless communicator SL1 is configured to be in the intermittent listen state ST1B while the first wired communicator SD1 is in the first wired communication state ST11. The first wireless communicator SL1 is configured to be in the intermittent listen state ST1B while the first wired communicator SD1 receives the electric power supply from the electric power source PS.

The first wireless communicator SL1 is configured to be in the intermittent listen state ST1B if the first wired communicator SD1 starts the first wired communication state ST11. The first controller SC1 is configured to control the first wireless communicator SL1 to be in the first wired communication state ST11 when the first wireless communicator SL1 starts to receive the electric power supply from the additional electric power source PS or the operated component S1 is turned on. The first controller SC1 is configured to control the first wireless communicator SL1 to maintain the first wired communication state ST11 while the first wireless communicator SL1 receives the electric power supply from the additional electric power source PS. However, the first wireless communicator SL1 can be configured to be in the continuous listen state ST1A while the first wired communicator SD1 is in the first wired communication state ST11.

The first wireless communicator SL1 is configured to maintain the intermittent listen state ST1B if the first wireless communicator SL1 does not recognize the wireless signal LS in the intermittent listen state ST1B. The first wireless communicator SL1 is configured to change the first wireless communication state ST12 from the intermittent listen state ST1B to the continuous listen state ST1A if the first wireless communicator SL1 recognizes the wireless signal LS in the intermittent listen state ST1B. The first controller SC1 is configured to control the first wireless communicator SL1 to change the first wireless communication state ST12 from the intermittent listen state ST1B to the continuous listen state ST1A if the first wireless communicator SL1 recognizes the wireless signal LS in the intermittent listen state ST1B.

The first wireless communicator SL1 is configured to change the state of the first wireless communicator SL1 from the first wired communication state ST11 to the first non-wired communication state ST13 if the first wireless communicator SL1 recognizes the wireless signal LS in the intermittent listen state ST1B or the first wireless communicator SL1 change the first wireless communication state ST12 from the intermittent listen state ST1B to the continuous listen state ST1A. The first controller SC1 is configured to control the first wireless communicator SL1 to change the state of the first wireless communicator SL1 from the first wired communication state ST11 to the first non-wired communication state ST13 if the first wireless communicator SL1 recognizes the wireless signal LS in the intermittent listen state ST1B or the first wireless communicator SL1 change the first wireless communication state ST12 from the intermittent listen state ST1B to the continuous listen state ST1A.

Figure 6:
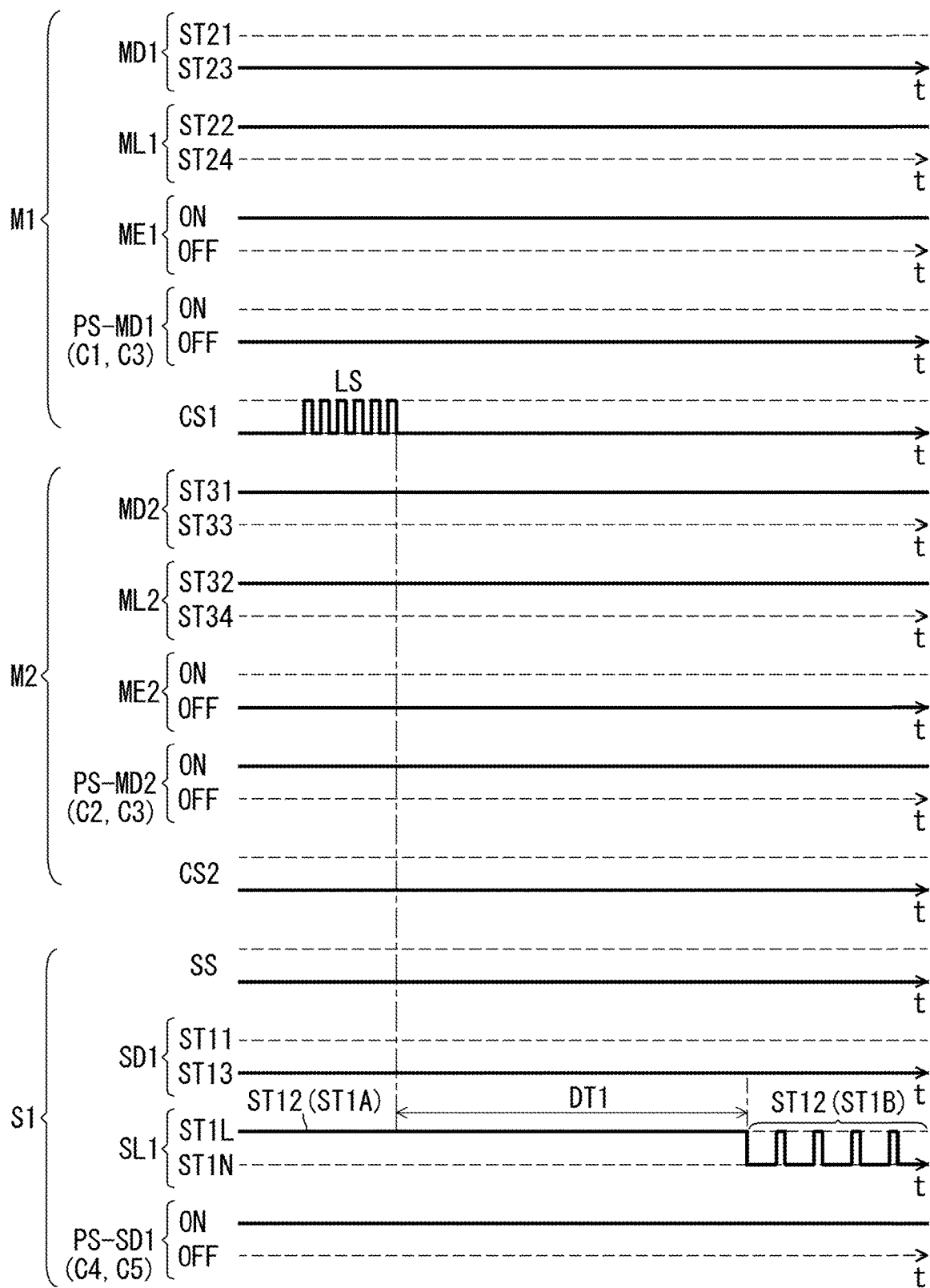

As seen in FIG. 6, the first wireless communicator SL1 is configured to change the first wireless communication state ST12 from the continuous listen state ST1A to the intermittent listen state ST1B if the first wireless communicator SL1 does not recognize the wireless signal LS during a determination time DT1 in the continuous listen state ST1A. The first controller SC1 is configured to control the first wireless communicator SL1 to change the first wireless communication state ST12 from the continuous listen state ST1A to the intermittent listen state ST1B if the first wireless communicator SL1 does not recognize the wireless signal LS during the determination time DT1 in the continuous listen state ST1A. Examples of the determination time DT1 includes 30 minutes, 20 minutes, and 15 minutes.

The first wired communicator SD1 is configured not to change the state of the first wired communicator SD1 from the first non-wired communication state ST13 to the first wired communication state ST11 even if the first wireless communicator SL1 changes the first wireless communication state ST12 from the continuous listen state ST1A to the intermittent listen state ST1B. The first wired communicator SD1 is configured not to change the state of the first wired communicator SD1 from the first non-wired communication state ST13 to the first wired communication state ST11 even if the first wireless communicator SL1 changes the first wireless communication state ST12 from the continuous listen state ST1A to the intermittent listen state ST1B.

As seen in FIG. 5, the second wired communicator MD1 has a second wired communication state ST21 in which the second wired communicator MD1 is configured to transmit and/or recognize the wired signal DS via the wired communication channel. In the present embodiment, the second wired communicator MD1 is configured to transmit the wired signal DS including the control signal CS1 (e.g., the first control signal CS11 and/or the first additional control signal CS12) via the wired communication channel in response to the user input U1 in the second wired communication state ST21. The second wired communicator MD1 is configured to recognize the wired signal DS including signals transmitted from other wired communicators via the wired communication channel in the second wired communication state ST21.

The second wired communicator MD1 has a second non-wired communication state ST23 in which the second wired communicator MD1 is configured not to transmit the wired signal DS regardless of the user input U1. The second non-wired communication state ST23 includes a state where the second wired communicator MD1 is configured to ignore the user input U1 and/or where the second wired communicator MD1 is turned off.

The second wireless communicator ML1 has a second wireless communication state ST22 in which the second wireless communicator ML1 is configured to transmit the wireless signal LS via the wireless communication channel. In the present embodiment, the second wired communicator MD1 is configured to transmit the wireless signal LS including the control signal CS1 (e.g., the first control signal CS11 and/or the first additional control signal CS12) via the wireless communication channel in response to the user input U1 in the second wired communication state ST21. In the second wireless communication state ST22, the second wireless communicator ML1 is configured to receive the wireless signal LS via the wireless communication channel.

The second wireless communicator ML1 has a second non-wireless communication state ST24 in which the second wireless communicator ML1 is configured not to transmit the wired signal DS regardless of the user input U1. The second non-wireless communication state ST24 includes a state where the second wireless communicator ML1 is configured to ignore the user input U1 and/or where the second wireless communicator ML1 is turned off.

The second wired communicator MD1 is configured be in both the second wired communication state ST21 and the second wireless communication state ST22. The second wired communicator MD1 is configured to recognize the wired signal DS but not to transmit the wired signal DS except for necessary communication signals while the second wireless communicator ML1 is in the second wireless communication state ST22.

The second wired communicator MD1 is configured to be in the second wired communication state ST21 in response to the electric power supply from the additional electric power source PS. The second controller MC1 is configured to control the second wired communicator MD1 to be in the second wired communication state ST21 in response to the electric power supply from the additional electric power source PS. The second controller MC1 is configured to control the second wired communicator MD1 to change the state of the second wired communicator MD1 from the second non-wired communication state ST23 to the second wired communication state ST21 when the second wired communicator MD1 starts to receive the electric power supply from the additional electric power source PS. The second wired communicator MD1 is configured to be in the second wired communication state ST21 while the second wired communicator MD1 receives the electric power supply from the additional electric power source PS. The second controller MC1 is configured to control the second wired communicator MD1 to be in the second wired communication state ST21 while the second wired communicator MD1 receives the electric power supply from the additional electric power source PS.

The second wired communicator MD1 is configured to be in the second non-wired communication state ST23 if the second wired communicator MD1 does not receive the electric power supply from the additional electric power source PS. The second controller MC1 is configured to control the second wired communicator MD1 to be in the second non-wired communication state ST23 if the second wired communicator MD1 does not receive the electric power supply from the additional electric power source PS.

The second controller MCI is configured to use the electric power supply from the first electric power source ME1 if the second wired communicator MD1 does not receive the electric power supply from the additional electric power source PS.

The second wireless communicator ML1 is configured to be in the second wireless communication state ST22 while the second wired communicator MD1 is in the non-wired communication state ST23 different from the second wired communication state ST21. The second controller MC1 is configured to control the second wireless communicator ML1 to be in the second wireless communication state ST22 while the second wired communicator MD1 is in the non-wired communication state ST23.

In the present embodiment, the second wireless communicator ML1 is configured to be in the second wireless communication state ST22 in response to the electric power supply from the first electric power source ME1. The second wireless communicator ML1 is configured to be in the second wireless communication state ST22 if the second wireless communicator ML1 receives the electric power supply from the first electric power source ME1 and the second wired communicator MD1 does not receive the electric power supply from the electric power source PS. The second controller MC1 is configured to control the second wireless communicator ML1 to be in the second wireless communication state ST22 if the second wireless communicator ML1 receives the electric power supply from the first electric power source ME1 and the second wired communicator MD1 does not receive the electric power supply from the electric power source PS.

If the second wired communicator MDI does not receive the electric power supply from the electric power source PS, the wired communication channel is disconnected between the second wired communicator MD1 and the additional wired communicator SD3. In the second wireless communication state ST22, however, the second wireless communicator ML1 is configured to transmit the wireless signal LS via the wireless communication channel in response to the user input U1. The first wireless communicator SL1 is configured to receive the wireless signal LS via the wireless communication channel in the first wireless communication state ST12 (e.g., the continuous listen state ST1A or the intermittent listen state ST1B). Thus, the first wireless communicator SL1 is configured to be in the first wireless communication state ST12 if the wired communication channel is disconnected.

As seen in FIG. 5, the third wired communicator MD2 has a third wired communication state ST31 in which the third wired communicator MD2 is configured to transmit and/or recognize the wired signal DS via the wired communication channel. In the present embodiment, the third wired communicator MD2 is configured to transmit the wired signal DS including the control signal CS2 (e.g., the second control signal CS21 and/or the second additional control signal CS22) via the wired communication channel in response to the user input U2 in the third wired communication state ST31. The third wired communicator MD2 is configured to recognize the wired signal DS including signals transmitted from other wired communicators via the wired communication channel in the third wired communication state ST31.

The third wired communicator MD2 has a third non-wired communication state ST33 in which the third wired communicator MD2 is configured not to transmit the wired signal DS regardless of the user input U2. The third non-wired communication state ST33 includes a state where the third wired communicator MD2 is configured to ignore the user input U2 and/or where the third wired communicator MD2 is turned off.

The third wireless communicator ML2 has a third wireless communication state ST32 in which the third wireless communicator ML2 is configured to transmit the wireless signal LS via the wireless communication channel. In the present embodiment, the third wired communicator MD2 is configured to transmit the wireless signal LS including the control signal CS2 (e.g., the second control signal CS21 and/or the second additional control signal CS22) via the wireless communication channel in response to the user input U2 in the third wired communication state ST31. In the third wireless communication state ST32, the third wireless communicator ML2 is configured to receive the wireless signal LS via the wireless communication channel.

The third wireless communicator ML2 has a third non-wireless communication state ST34 in which the third wireless communicator ML2 is configured not to transmit the wired signal DS regardless of the user input U2. The third non-wireless communication state ST34 includes a state where the third wireless communicator ML2 is configured to ignore the user input U2 and/or where the third wireless communicator ML2 is turned off.

The third wired communicator MD2 is configured be in both the third wired communication state ST31 and the third wireless communication state ST32. The third wired communicator MD2 is configured to recognize the wired signal DS but not to transmit the wired signal DS except for necessary communication signals while the third wireless communicator ML2 is in the third wireless communication state ST32.

The third wired communicator MD2 is configured to be in the third wired communication state ST31 in response to the electric power supply from the additional electric power source PS. The third controller MC2 is configured to control the third wired communicator MD2 to be in the third wired communication state ST31 in response to the electric power supply from the additional electric power source PS. The third wired communicator MD2 is configured to be in the third wired communication state ST31 while the third wired communicator MD2 receives the electric power supply from the additional electric power source PS. The third controller MC2 is configured to control the third wired communicator MD2 to be in the third wired communication state ST31 while the third wired communicator MD2 receives the electric power supply from the additional electric power source PS.

The third wired communicator MD2 is configured to be in the third non-wired communication state ST33 if the third wired communicator MD2 does not receive the electric power supply from the additional electric power source PS. The third controller MC2 is configured to control the third wired communicator MD2 to be in the third non-wired communication state ST33 if the third wired communicator MD2 does not receive the electric power supply from the additional electric power source PS.

The third controller MC2 is configured to use the electric power supply from the second electric power source ME2 if the third wired communicator MD2 does not receive the electric power supply from the additional electric power source PS.

The third wireless communicator ML2 is configured to be in the third wireless communication state ST32 while the third wired communicator MD2 is in the non-wired communication state ST33 different from the third wired communication state ST31. The third controller MC2 is configured to control the third wireless communicator ML2 to be in the third wireless communication state ST32 while the third wired communicator MD2 is in the non-wired communication state ST33.

In the present embodiment, the third wireless communicator ML2 is configured to be in the third wireless communication state ST32 in response to the electric power supply from the second electric power source ME2. The third wireless communicator ML2 is configured to be in the third wireless communication state ST32 if the third wireless communicator ML2 receives the electric power supply from the second electric power source ME2 and the third wired communicator MD2 does not receive the electric power supply from the electric power source PS. The third controller MC2 is configured to control the third wireless communicator ML2 to be in the third wireless communication state ST32 if the third wireless communicator ML2 receives the electric power supply from the second electric power source ME2 and the third wired communicator MD2 does not receive the electric power supply from the electric power source PS.

As seen in FIG. 5, the first controller SC1 is configured to control the first wired communicator SD1 to transmit a state communication signal SS to the second wired communicator MD1 and the third wired communicator MD2 via the wired communication channel when the first wireless communicator SL1 changes the state of the first wireless communicator SL1 from the intermittent listen state ST1B to the continuous listen state ST1A. The second controller MC1 is configured to control the second wireless communicator ML1 to change the state of the second wireless communicator ML1 from the second non-wireless communication state ST24 to the second wireless communication state ST22 in response to the state communication signal SS if the second wireless communicator ML1 is in the second non-wireless communication state ST24. The third controller MC2 is configured to control the third wireless communicator ML2 to change the state of the third wireless communicator ML2 from the third non-wireless communication state ST34 to the third wireless communication state ST32 in response to the state communication signal SS if the third wireless communicator ML2 is in the third non-wireless communication state ST34.

Figure 7:
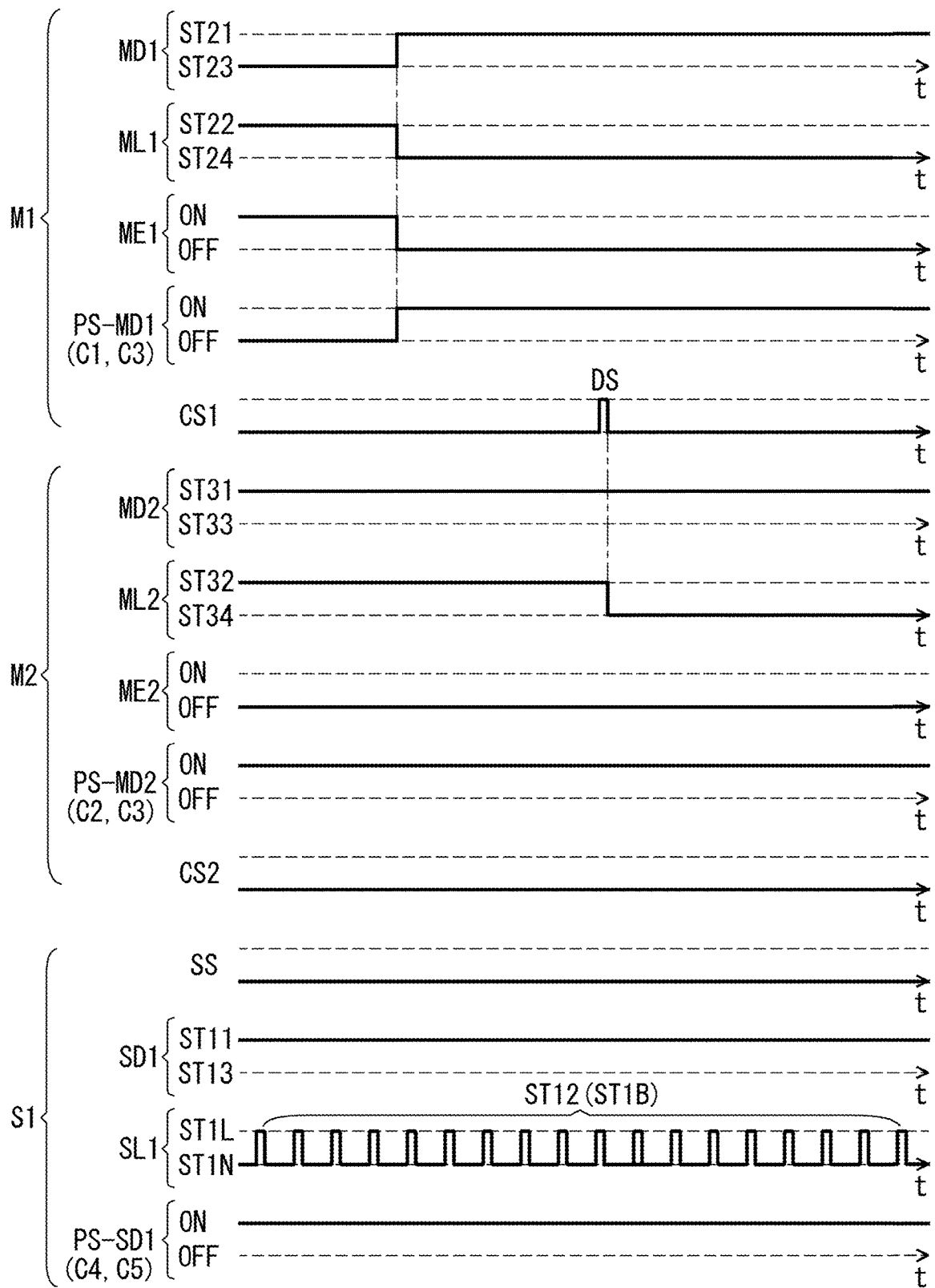

As seen in FIG. 7, the second controller MC1 is configured to control the second wired communicator MD1 to change the state of the second wired communicator MD1 from the second non-wired communication state ST23 to the second wired communication state ST21 if the second wired communicator MD1 starts to receive the electric power supply from the electric power source PS. The second controller MC1 is configured to control the second wireless communicator ML1 to change the state of the second wireless communicator ML1 from the second non-wireless communication state ST24 to the second wireless communication state ST22 if the second wired communicator MD1 starts to receive the electric power supply from the electric power source PS. The second controller MC1 is configured to control the first electric power source ME1 to stop the electric power supply if the second wired communicator MD1 starts to receive the electric power supply from the electric power source PS.

The third controller MC2 is configured to control the third wireless communicator ML2 to change the state of the third wireless communicator ML2 from the third non-wireless communication state ST34 to the third wireless communication state ST32 if the third wired communicator MD2 recognizes the wired signal DS such as the control signal CS1 or CS2 transmitted from the second wired communicator MD1 or the third wired communicator MD2 via the wired communication channel.

Figure 8:
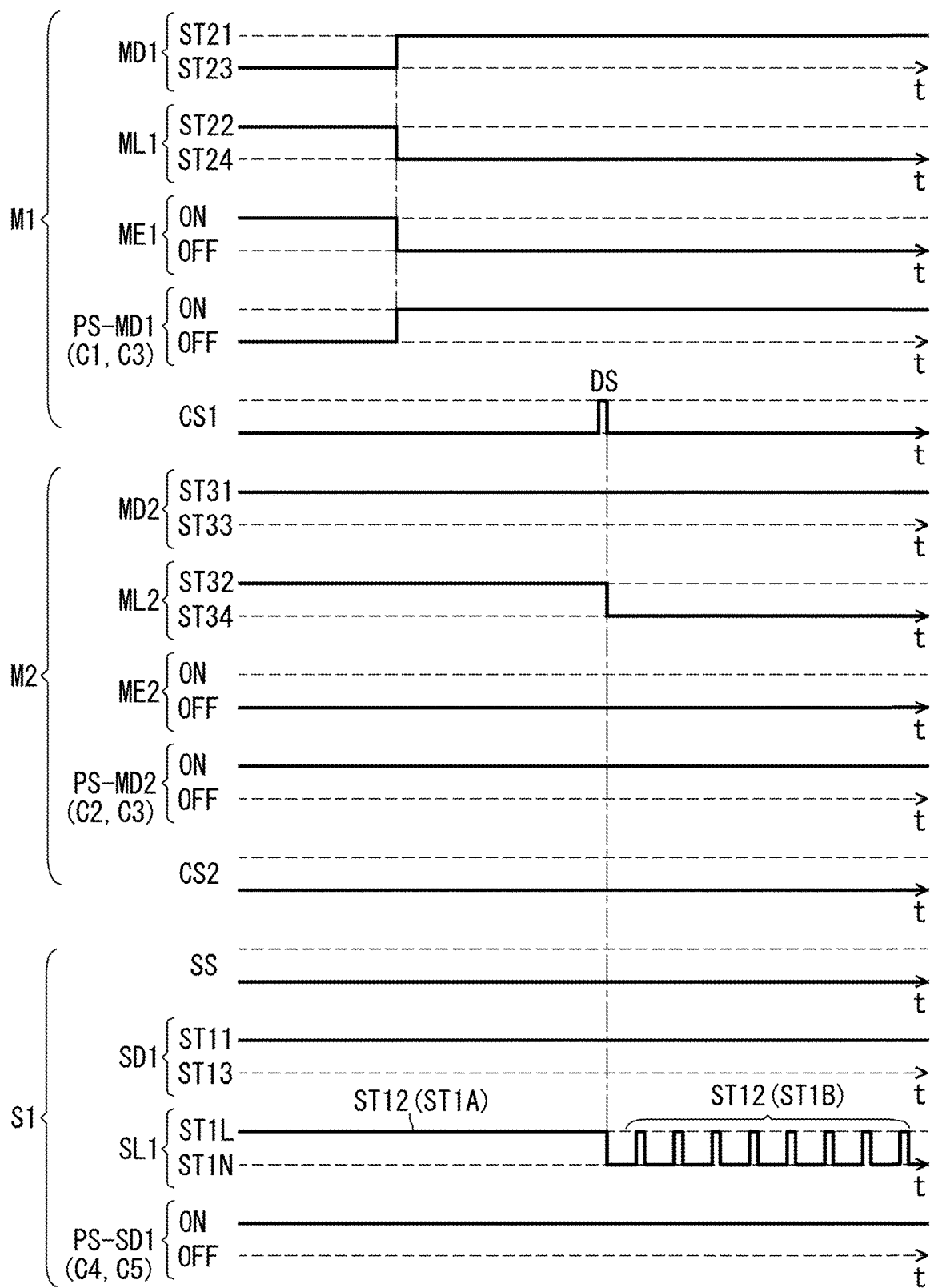

As seen in FIG. 8, the first wireless communicator SL1 is configured to be in the intermittent listen state ST1B if the first wired communicator SD1 starts the first wired communication state ST11. For example, in a state where the first wireless communicator SL1 is in the continuous listen state ST1A, the first controller SC1 is configured to control the first wireless communicator SL1 to change the state of the first wireless communicator SL1 from the continuous listen state ST1A to the intermittent listen state ST1B if the first wired communicator SD1 receives the wired signal DS such as the control signal CS1 or CS2 transmitted from the second wired communicator MD1 or the third wired communicator MD2 via the wired communication channel.

The timing charts of the input component M1 depicted in FIGS. 5 to 8 and the description thereof can apply to the additional input component M2 if the wired communication is not available in the additional input component M2.

If the electric cable C3 is unintentionally disconnected from the junction J1 and/or J2 in the state illustrated in FIG. 3, the electric power supply is interrupted between the electric power source PS and each of the input component M1 and the additional input component M2. Thus, as seen in FIG. 5, the second controller MC1 of the input component M1 controls the second wireless communicator ML1 to change the state of the second wireless communicator ML1 from the second non-wireless communication state ST24 to the second wireless communication state ST22 in response to the interruption of the electric power supply from the electric power source PS. As with the input component M1, the third controller MC2 of the additional input component M2 controls the third wireless communicator ML2 to change the state of the third wireless communicator ML2 from the third non-wireless communication state ST34 to the third wireless communication state ST32 in response to the interruption of the electric power supply from the electric power source PS.

Accordingly, each of the input component M1 and the additional input component M2 can communicate with the first wireless communicator SL1 of the operated component S1 via the wireless communication channel if the electric cable C3 is unintentionally disconnected from the junction J1 and/or J2.

If the electric cable C1 is unintentionally disconnected from the junction J1 in the state illustrated in FIG. 3, the electric power supply is interrupted between the electric power source PS and the input component M1. Thus, as seen in FIG. 5, the second controller MC1 of the input component M1 controls the second wireless communicator ML1 to change the state of the second wireless communicator ML1 from the second non-wireless communication state ST24 to the second wireless communication state ST22 in response to the interruption of the electric power supply from the electric power source PS.

As seen in FIG. 5, however, the third controller MC2 of the additional input component M2 is configured to control the third wireless communicator ML2 to maintain the third non-wireless communication state ST34 because the additional input component M2 still receives the electric power supply from the electric power source PS. If the second wireless communicator ML1 transmits the wireless signal LS in response to the user input U2, the first wireless communicator SL1 changes the first wireless communication state ST12 from the intermittent listen state ST1B to the continuous listen state ST1A in response to the wireless signal LS. The first controller SC1 controls the first wired communicator SD1 to transmit the state communication signal SS to the third wired communicator MD2 via the wired communication channel. The third controller MC2 controls the third wireless communicator ML2 to change the state of the third wireless communicator ML2 from the third non-wireless communication state ST34 to the third wireless communication state ST32 in response to the state communication signal SS.

Accordingly, each of the input component M1 and the additional input component M2 can communicate with the first wireless communicator SL1 of the operated component S1 via the wireless communication channel if the electric cable C1 is unintentionally disconnected from the junction J1.

If the electric cable C2 is unintentionally disconnected from the junction J1 in the state illustrated in FIG. 3, the electric power supply is interrupted between the electric power source PS and the additional input component M2. As with the input component M1 illustrated in FIG. 5, the third controller MC2 of the additional input component M2 controls the third wireless communicator ML2 to change the state of the third wireless communicator ML2 from the third non-wireless communication state ST34 to the third wireless communication state ST32 in response to the interruption of the electric power supply from the electric power source PS.

As with the additional input component M2 illustrated in FIG. 5, however, the second controller MC1 of the input component M1 is configured to control the second wireless communicator ML1 to maintain the second non-wireless communication state ST24 because the input component M1 still receives the electric power supply from the electric power source PS. If the third wireless communicator ML2 transmits the wireless signal LS in response to the user input U2, the first wireless communicator SL1 changes the first wireless communication state ST12 from the intermittent listen state ST1B to the continuous listen state ST1A in response to the wireless signal LS. The first controller SC1 controls the first wired communicator SD1 to transmit the state communication signal SS to the second wired communicator MD2 via the wired communication channel. The second controller MC1 controls the second wireless communicator ML1 to change the state of the second wireless communicator ML1 from the second non-wireless communication state ST24 to the second wireless communication state ST22 in response to the state communication signal SS.

Accordingly, each of the input component M1 and the additional input component M2 can communicate with the first wireless communicator SL1 of the operated component S1 via the wireless communication channel if the electric cable C2 is unintentionally disconnected from the junction J1.

As seen in FIG. 7, if the electric power source from the electric power source PS to the input component M1 is restored by connecting the electric cable C1 or C3 to the junction J1 and/or J2, the second controller MC1 of the input component M1 controls the second wired communicator MD1 to change the state of the second wired communicator MD1 from the second non-wired communication state ST23 to the second wired communication state ST22 in response to the electric power supply from the electric power source PS. The second controller MC1 of the input component M1 controls the second wireless communicator ML1 to change the state of the second wireless communicator ML1 from the second wireless communication state ST22 to the second non-wireless communication state ST24 in response to the electric power supply from the electric power source PS. Thus, the input component M1 can communicate with the first wired communicator SD1 of the operated component S1 via the wired communication channel if the electric power supply from the electric power source PS is restored.

As with the input component Ml illustrated in FIG. 7, if the electric power source from the electric power source PS to the input component M1 is restored by connecting the electric cable C2 or C3 to the junction J1 and/or J2, the third controller MC2 of the additional input component M2 controls the third wired communicator MD2 to change the state of the third wired communicator MD2 from the third non-wired communication state ST33 to the third wired communication state ST32 in response to the electric power supply from the electric power source PS. The third controller MC2 of the additional input component M2 controls the third wireless communicator ML2 to change the state of the third wireless communicator ML2 from the third wireless communication state ST32 to the third non-wireless communication state ST34 in response to the electric power supply from the electric power source PS. Thus, the additional input component M2 can communicate with the first wired communicator SD1 of the operated component Si via the wired communication channel if the electric power supply from the electric power source PS is restored.

Modifications

Each of the communicators SD1, SD2, SD3, MD1, MD2, SL1, ML1, and ML2 can include only a transmitter, only a receiver, or both the transmitter and receiver. Each of the communicators SD1, SD2, SD3, MD1, MD2, SL1, ML1, and ML2 can be provided to other components.

In the above embodiment, the additional wired communicator SD3 is configured to directly communicate with the second wired communicator MD1 and the third wired communicator MD2 via the wired communication channel. However, the first wired communicator SD1 can be configured to directly communicate with the second wired communicator MD1 via the wired communication channel if needed and/or desired. The fourth wired communicator SD2 can be configured to directly communicate with the third wired communicator MD2 via the wired communication channel if needed and/or desired.

In the above embodiment, the first controller SC1 is mounted to the operated component S1. The fourth controller SC2 is mounted to the additional operated component S2. The actuation controller SC3 is mounted to the electric power source PS. However, at least two of the first controller SC1, the fourth controller SC2, and the actuation controller SC3 can be mounted to the same component. At least two of the first controller SC1, the fourth controller SC2, and the actuation controller SC3 can be integrally provided with each other as a single controller.

The input component M1 and the additional input component M2 can be integrally provided with each other as a single component. The total number of the electric switches is not limited to the above embodiment. The structures of the user input interfaces MF1 and MF2 are not limited to the above embodiment.

Each of the operated component S1 and the additional operated component S2 can include an electric power source which is a separate electric power source from the electric power source PS.

Figure 9:
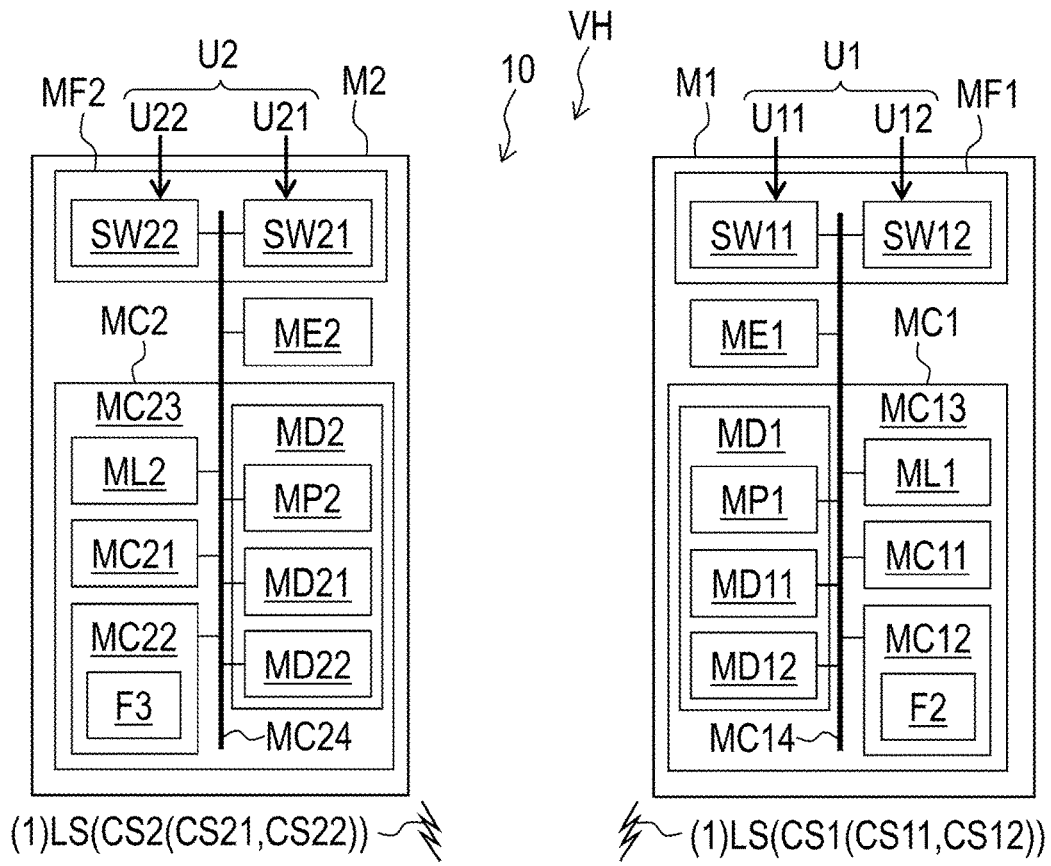
FIG. 9 is a schematic block diagram of a communication system in accordance with a modification (wireless communication).
Figure 9:
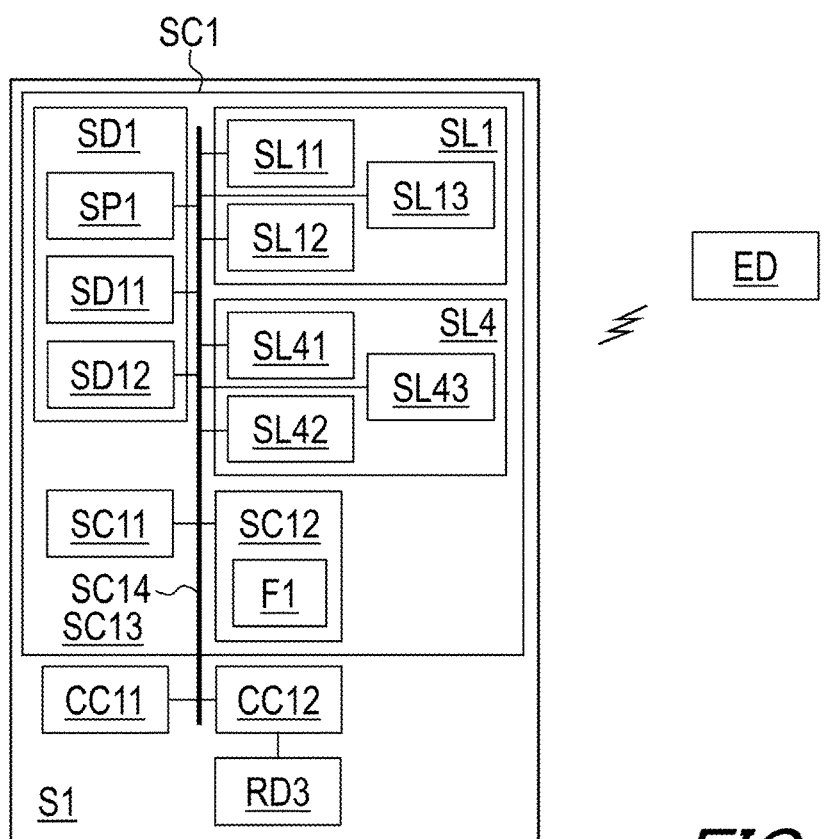

As seen in FIG. 9, the communication system 10 can include an external electric device ED. Examples of the external electric device ED include a smartphone, a tablet computer, and a cycle computer. The operated component S1 can be configured to wirelessly communicate with the external electric device ED. The operated component S1 includes a first additional wireless communicator SL4 in addition to the first wireless communicator SL1. The first additional wireless communicator SL4 is configured to wirelessly communicate with the external electric device ED.

The first wireless communicator SL1 is configured to wirelessly communicate with the second wireless communicator ML1 of the input component M1 and the third wireless communicator ML2 of the additional input component M2 using a first wireless communication protocol. Examples of the first wireless communication protocol of the first wireless communicator SL1 includes ANT, ANT+, Bluetooth, and BLE. The first wireless communicator SL1 is configured to not wirelessly communicate with the external electric device ED.

The first wireless communicator SL1 includes a signal transmitting circuit SL11, a signal receiving circuit SL12, and an antenna SL13. The signal transmitting circuit SL11, the signal receiving circuit SL12, and the antenna SL13 are electrically mounted on the circuit board SC13. Each of the signal transmitting circuit SL11, the signal receiving circuit SL12, and the antenna SL13 is electrically connected to the processor SC11 and the memory SC12 with the circuit board SC13 and the system bus SC14.

The signal transmitting circuit SL11 is configured to superimpose digital signals on carrier wave using the first wireless communication protocol to wirelessly transmit the digital signal. In the present embodiment, the signal transmitting circuit SL11 is configured to encrypt signals using a cryptographic key to generate encrypted wireless signals. The signal receiving circuit SL12 is configured to receive a wireless signal via the antenna SL13. In the present embodiment, the signal receiving circuit SL12 is configured to decode the wireless signal to recognize signals and/or information wirelessly transmitted from another wireless communicator (e.g., the second wireless communicator ML1 and the third wireless communicator ML2). The signal receiving circuit SL12 is configured to decrypt the wireless signal using the cryptographic key.

The first additional wireless communicator SL4 is configured to wirelessly communicate with the external electric device ED using a first additional wireless communication protocol. The first additional wireless communication protocol of the first additional wireless communicator SL4 is different from the first wireless communication protocol of the first wireless communicator SL1. Examples of the first additional wireless communication protocol of the first additional wireless communicator SL4 includes ANT, ANT+, Bluetooth, and BLE. The first additional wireless communicator SL4 is configured to not wirelessly communicate with the input component M1 and the additional input component M2.

The first additional wireless communicator SL4 includes a signal transmitting circuit SL41, a signal receiving circuit SL42, and an antenna SL43. The signal transmitting circuit SL41, the signal receiving circuit SL42, and the antenna SL43 are electrically mounted on the circuit board SC13. Each of the signal transmitting circuit SL41, the signal receiving circuit SL42, and the antenna SL43 is electrically connected to the processor SC11 and the memory SC12 with the circuit board SC13 and the system bus SC14.

The signal transmitting circuit SL41 is configured to superimpose digital signals on carrier wave using the first additional wireless communication protocol to wirelessly transmit the digital signal. In the present embodiment, the signal transmitting circuit SL41 is configured to encrypt signals using a cryptographic key to generate encrypted wireless signals. The signal receiving circuit SL42 is configured to receive a wireless signal via the antenna SL43. In the present embodiment, the signal receiving circuit SL42 is configured to decode the wireless signal to recognize signals and/or information wirelessly transmitted from another wireless communicator. The signal receiving circuit SL42 is configured to decrypt the wireless signal using the cryptographic key.

Figure 10:
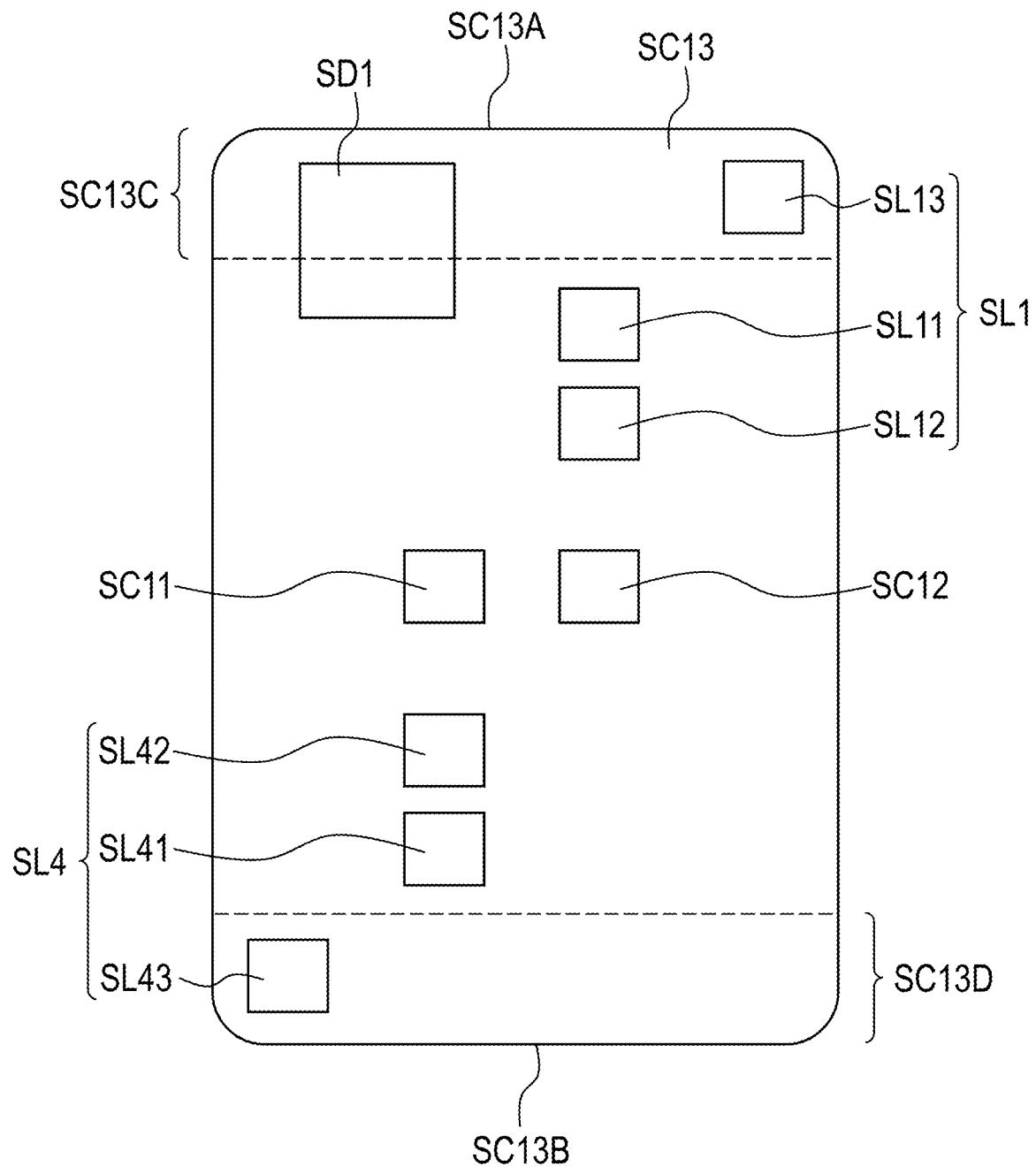
FIG. 10 is a schematic plan view showing the arrangement of electric components of an operated device of the communication system in accordance with the modification.

As seen in FIG. 10, the antenna SL13 of the first wireless communicator SL1 is spaced apart from the antenna SL43 of the first additional wireless communicator SL4. The circuit board SC13 includes a first end SC13A and a second end SC13B opposite to the first end SC13A. The circuit board SC13 includes a first region SC13C in which the first end SC13A is provided. The circuit board SC13 includes a second region SC13D in which the second end SC13B is provided.

The antenna SL13 of the first wireless communicator SL1 is closer to the first end SL13A than to the second end SL13B. The antenna SL43 of the first additional wireless communicator SL4 is closer to the second end SL13B than to the first end SL13A. The antenna SL13 of the first wireless communicator SL1 is provided in the first region SC13C. The antenna SL43 of the first additional wireless communicator SL4 is provided in the second region SC13D.

Figure 11:
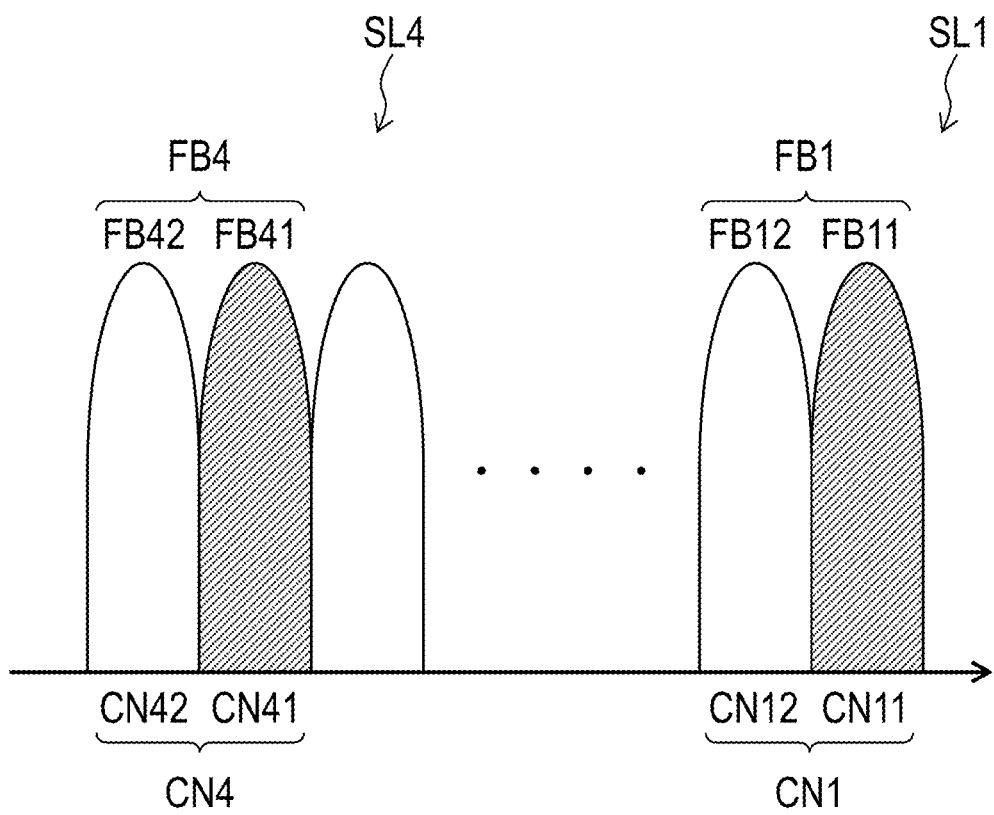
FIG. 11 is a schematic diagram showing frequency bands of communication channels of the communication system in accordance with the modification.

As seen in FIG. 11, the first wireless communicator SL1 is configured to wirelessly communicate with the second wireless communicator ML1 of the input component M1 and the third wireless communicator ML2 of the additional input component M2 via a first wireless communication channel CN1. The first additional wireless communicator SL4 is configured to wirelessly communicate with the external electric device ED via a first additional wireless communication channel CN4.

The first wireless communication channel CN1 of the first wireless communicator SL1 has a first frequency band FB1. The first additional wireless communication channel CN4 of the first additional wireless communicator SL4 has a first additional frequency band FB4 different from the first frequency band FB1 of the first wireless communication channel CN1 of the first wireless communicator SL1.

In the present embodiment, the first wireless communication channel CN1 of the first wireless communicator SL1 includes a first advertising channel CN11 and a first data channel CN12. The first advertising channel CN11 has a first frequency band FB11. The first data channel CN12 has a first frequency band FB12 different from the first frequency band FB11. However, the first frequency band FB12 of the first data channel CN12 can be equal to the first frequency band FB11 of the first advertising channel CN11.

For example, the first wireless communicator SL1 is configured to wirelessly transmit and/or receive advertising packets, scan request/response packets, and/or connection indication packets to the second wireless communicator ML1 and the third wireless communicator ML2 via the first advertising channel CN11. The first wireless communicator SL1 is configured to wirelessly exchange data packets with the second wireless communicator ML1 and the third wireless communicator ML2 via the first data channel CN12.

In the present embodiment, the first additional wireless communication channel CN4 of the first additional wireless communicator SL4 includes a first additional advertising channel CN41 and a first additional data channel CN42. The first additional advertising channel CN41 has a first additional frequency band FB41. The first additional data channel CN42 has a first additional frequency band FB42 different from the first additional frequency band FB41. However, the first additional frequency band FB42 of the first additional data channel CN42 can be equal to the first additional frequency band FB41 of the first additional advertising channel CN41.

For example, the first additional wireless communicator SL4 is configured to wirelessly transmit and/or receive advertising packets, scan request/response packets, and/or connection indication packets to the external electric device ED via the first additional advertising channel CN41. The first additional wireless communicator SL4 is configured to wirelessly exchange data packets with the external electric device ED via the first additional data channel CN42.

As seen in FIG. 11, the first frequency band FB11 of the first advertising channel CN11 is different from the first additional frequency band FB41 of the first additional advertising channel CN41 and the first additional frequency band FB42 of the first additional data channel CN42. The first frequency band FB12 of the first data channel CN12 is different from the first additional frequency band FB41 of the first additional advertising channel CN41 and the first additional frequency band FB42 of the first additional data channel CN42. However, at least one of the first frequency band FB11 and the first frequency band FB12 can be equal to at least one of the first additional frequency band FB41 and the first additional frequency band FB42.

In the present embodiment, each of the first frequency band FB11 and the first frequency band FB12 is higher than the first additional frequency band FB41 and the first additional frequency band FB42. For example, a difference between the first frequency band FB11 and the first additional frequency band FB41 is larger than 50 Hz. A difference between the first frequency band FB12 and the first additional frequency band FB42 is larger than 50 Hz. However, the difference between the first frequency band FB11 and the first additional frequency band FB41 is not limited to the above range. The difference between the first frequency band FB12 and the first additional frequency band FB42 is not limited to the above range.

In the above modification depicted in FIGS. 9 to 11, the first additional frequency band FB4 of the first additional wireless communication channel of the first additional wireless communicator SL4 is different from the first frequency band FB1 of the first wireless communication channel CN1 of the first wireless communicator SL1. Thus, it is possible to reduce interference between the first wireless communication channel CN1 and the first additional wireless communication channel CN4.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operated component for a human-powered vehicle, comprising:
   a first wired communicator having a first wired communication state in which the first wired communicator is configured to recognize a wired signal transmitted via a wired communication channel;
   a first wireless communicator having a first wireless communication state in which the first wireless communicator is configured to recognize a wireless signal transmitted via a wireless communication channe; and
   an electric component including
      a base member,
      a movable member movably coupled to the base member, and
      an electric actuator configured to move the movable member relative to the base member,
   the first wired communicator and the first wireless communicator are electrically mounted on a circuit board,
   the circuit board is mounted to the base member of the electric component, and
   the first wireless communicator being configured to be in the first wireless communication state while the first wired communicator is in the first wired communication state.

2. An operated component for a human-powered vehicle, comprising:
   a first wired communicator having a first wired communication state in which the first wired communicator is configured to recognize a wired signal transmitted via a wired communication channel; and
   a first wireless communicator having a first wireless communication state in which the first wireless communicator is configured to recognize a wireless signal transmitted via a wireless communication channel,
   the first wireless communicator being configured to be in the first wireless communication state in response to disconnection of the wired communication channel.

3. The operated component according to claim 2, wherein the first wireless communicator has
   a listen condition in which the first wireless communicator is configured to recognize the wireless signal, and
   a non-listen condition in which the first wireless communicator is configured not to recognize the wireless signal,
   the first wireless communication state includes at least one of
      a continuous listen state in which the listen condition is continuously maintained without the non-listen condition, and
      an intermittent listen state in which the listen condition and the non-listen condition are alternately repeated, and
   the first wireless communicator is configured to be in at least one of the continuous listen state and the intermittent listen state while the first wired communicator is in the first wired communication state.

4. The operated component according to claim 3, wherein the first wireless communicator is configured to be in the intermittent listen state if the first wired communicator starts the first wired communication state.

5. The operated component according to claim 3, wherein the first wireless communicator is configured to change the first wireless communication state from the intermittent listen state to the continuous listen state if the first wireless communicator recognizes the wireless signal in the intermittent listen state.

6. The operated component according to claim 3, wherein the first wireless communicator is configured to change the first wireless communication state from the continuous listen state to the intermittent listen state if the first wireless communicator does not recognize a wireless signal during a determination time in the continuous listen state.

7. The operated component according to claim 2, further comprising
   an additional wired communicator configured to communicate with the first wired communicator via the wired communication channel.

8. The operated component according to claim 7, wherein
the additional wired communicator is configured to receive a control signal transmitted from the second wired communicator via the wired communication channel, and
the additional wired communicator is configured to transmit the wired signal to the first wired communicator via the wired communication channel based on the control signal.

9. The operated component according to claim 7, wherein the first wired communicator and the first wireless communicator are configured to be integrally provided with a single unit and configured to be provided as a separate unit from the additional wired communicator.

10. The operated component according to claim 7, wherein
the additional wired communicator includes an additional connection port to which an electric cable is to be connected.

11. The operated component according to claim 2, wherein
the first wired communicator includes a first connection port to which an electric cable is to be connected.

12. The operated component according to claim 2, wherein
the first wireless communicator is configured to be electrically connected to the first wired communicator without an electric cable.

13. The operated component according to claim 2, further comprising
an electric component including
a base member,
a movable member movably coupled to the base member, and
an electric actuator configured to move the movable member relative to the base member; and
a component controller configured to control the electric actuator to move the movable member relative to the base member.

14. A communication system comprising:
the operated component according to claim 2; and
an input component including
a second wired communicator having a second wired communication state in which the second wired communicator is configured to transmit and/or recognize the wired signal via the wired communication channel, and
a second wireless communicator having a second wireless communication state in which the second wireless communicator is configured to transmit the wireless signal via the wireless communication channel, and
the second wireless communicator being configured to be in the second wireless communication state while the second wired communicator is in a non-wired communication state different from the second wired communication state.

15. The communication system according to claim 14, wherein
the operated component further comprises an additional wired communicator configured to communicate with the second wired communicator via the wired communication channel.

16. The communication system according to claim 15, wherein
the first wired communicator is configured to communicate with at least one of the second wired communicator and the additional wired communicator via the wired communication channel.

17. The communication system according to claim 15, wherein
the second wireless communicator is configured to communicate with the first wireless communicator via the wireless communication channel, and
the first wired communicator is configured to communicate with the additional wired communicator via the wired communication channel.

18. The communication system according to claim 14, wherein
the second wired communicator includes a second connection port to which an electric cable is to be connected.

19. The communication system according to claim 14, wherein
the second wireless communicator is configured to receive electric power supply from a first electric power source, and
the second wireless communicator is configured to be in the second wireless communication state in response to the electric power supply from the first electric power source.

20. The communication system according to claim 14, wherein
the second wired communicator is configured to receive electric power supply from an additional electric power source different from the first electric power source, and
the second wired communicator is configured to be in the second wired communication state in response to the electric power supply from the additional electric power source.

21. The communication system according to claim 20, wherein
the first wired communicator is configured to receive electric power supply from the additional electric power source, and
the first wireless communicator is configured to receive electric power supply from the additional electric power source.

22. The communication system according to claim 15, wherein
the operated component comprises
an electric component including
a base member,
a movable member movably coupled to the base member, and
an electric actuator configured to move the movable member relative to the base member, and
a component controller configured to control the electric actuator to move the movable member relative to the base member,
the second wired communicator is configured to transmit, to the additional wired communicator, first control information included in the wired signal transmitted via the wired communication channel,
the additional wired communicator is configured to transmit, to the first wired communicator, the first control information included in the wired signal transmitted via the wired communication channel, and
the component controller is configured to control the electric actuator to move the movable member relative to the base member based on the first control information.

23. The communication system according to claim 22, wherein
the second wireless communicator is configured to transmit, to the first wireless communicator, second control information included in the wireless signal transmitted via the wireless communication channel, and
the component controller is configured to control the electric actuator to move the movable member relative to the base member based on the second control information.

24. The communication system according to claim 23, wherein
the first wireless communicator is configured to transmit, to the first wired communicator, second control information included in the wireless signal transmitted via the wireless communication channel.

25. The communication system according to claim 24, wherein
the operated component further comprises an additional wired communicator configured to communicate with the first wired communicator via the wired communication channel, and
the first wired communicator is configured to transmit the second control information to the additional wired communicator via the wired communication channel.

26. The operated component according to claim 24, wherein
the disconnection of the wired communication channel involves cable disconnection.

27. The operated component according to claim 24, wherein
the operated component is automatically changed to the first wireless communication state in response to the disconnection of the wired communication channel.

28. An operated component for a human-powered vehicle, comprising:
a first wired communicator having a first wired communication state in which the first wired communicator is configured to recognize a wired signal transmitted via a wired communication channel; and
a first wireless communicator having a first wireless communication state in which the first wireless communicator is configured to recognize a wireless signal transmitted via a wireless communication channel, the first wireless communicator being configured to be in the first wireless communication state while the first wired communicator is in the first wired communication state, the first wireless communicator has
a listen condition in which the first wireless communicator is configured to recognize the wireless signal, and
a non-listen condition in which the first wireless communicator is configured not to recognize the wireless signal,
the first wireless communication state includes at least one of
a continuous listen state in which the listen condition is continuously maintained without the non-listen condition, and
an intermittent listen state in which the listen condition and the non-listen condition are alternately repeated, and
the first wireless communicator is configured to be in at least one of the continuous listen state and the intermittent listen state while the first wired communicator is in the first wired communication state.

29. The operated component according to claim 28, wherein
the first wireless communicator is configured to be in the intermittent listen state if the first wired communicator starts the first wired communication state.

30. The operated component according to claim 28, wherein
the first wireless communicator is configured to change the first wireless communication state from the intermittent listen state to the continuous listen state if the first wireless communicator recognizes the wireless signal in the intermittent listen state.

31. The operated component according to claim 28, wherein
the first wireless communicator is configured to change the first wireless communication state from the continuous listen state to the intermittent listen state if the first wireless communicator does not recognize a wireless signal during a determination time in the continuous listen state.

* * * * *